United States Patent
Satoh et al.

(10) Patent No.: US 8,478,561 B2
(45) Date of Patent: Jul. 2, 2013

(54) ROTATION MEASURING MECHANISM, SHEET CONVEYANCE APPARATUS, ORIGINAL READING APPARATUS, AND IMAGE FORMING APPARATUS

(75) Inventors: Osamu Satoh, Sagamihara (JP); Yasushi Nakazato, Tokyo (JP); Kohji Ue, Ebina (JP); Mikiko Imazeki, Ebina (JP); Masahide Yamashita, Tokyo (JP); Jun Yamane, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 326 days.

(21) Appl. No.: 12/916,925

(22) Filed: Nov. 1, 2010

(65) Prior Publication Data

US 2011/0106489 A1 May 5, 2011

(30) Foreign Application Priority Data

Nov. 2, 2009 (JP) ................................. 2009-251874

(51) Int. Cl.
*G01C 9/00* (2006.01)
(52) U.S. Cl.
USPC ........................................................... 702/151
(58) Field of Classification Search
USPC .................................. 702/151, 150, 182–185
See application file for complete search history.

(56) References Cited

U.S. PATENT DOCUMENTS

| | | | |
|---|---|---|---|
| 4,753,433 A | 6/1988 | Rodi et al. | |
| 5,464,200 A | 11/1995 | Nakazato et al. | |
| 5,482,265 A | 1/1996 | Nakazato et al. | |
| 5,559,602 A * | 9/1996 | Nyui | 356/616 |
| 6,345,170 B1 | 2/2002 | Nakazato et al. | |
| 6,470,169 B2 | 10/2002 | Nakazato | |
| 6,669,189 B2 | 12/2003 | Seto et al. | |
| 6,677,749 B2 | 1/2004 | Butikofer et al. | |
| 6,681,096 B2 | 1/2004 | Seto et al. | |
| 2005/0286916 A1 | 12/2005 | Nakazato et al. | |
| 2009/0190939 A1 | 7/2009 | Satoh et al. | |
| 2009/0196634 A1 | 8/2009 | Satoh et al. | |
| 2010/0098471 A1 | 4/2010 | Satoh et al. | |

FOREIGN PATENT DOCUMENTS

| | | |
|---|---|---|
| CN | 101234710 A | 8/2008 |
| EP | 0 849 929 B1 | 7/2009 |
| JP | 62-269833 A | 11/1987 |
| JP | 4-5676 | 1/1992 |
| JP | 3048685 | 3/2000 |
| JP | 3277204 | 2/2002 |

(Continued)

OTHER PUBLICATIONS

U.S. Appl. No. 07/987,189, filed Dec. 8, 1992, Yasushi Nakazato.

(Continued)

*Primary Examiner* — Edward Raymond
(74) *Attorney, Agent, or Firm* — Oblon, Spivak, McClelland, Maier & Neustadt, L.L.P.

(57) ABSTRACT

A rotation measuring mechanism capable of measuring a rotation amount and a displacement amount of a rotary member in a direction perpendicular to the rotation axis is provided. An exemplary combination of the rotation measuring mechanism includes a detection target rotating in synchrony with the rotary member and range sensors. Each time the detection target rotates once, each sensor outputs one cycle of a sine wave. The amplitude of the sine wave output from the sensor varies in accordance with the displacement of the detection target together with the rotary member in the direction perpendicular to the axis, thereby obtaining the rotation amount and the displacement amount of the rotary member.

17 Claims, 33 Drawing Sheets

FOREIGN PATENT DOCUMENTS

| | | |
|---|---|---|
| JP | 3344359 | 8/2002 |
| JP | 2004-284794 | 10/2004 |
| JP | 2007-137645 | 6/2007 |
| JP | 4103648 | 4/2008 |
| JP | 4186666 | 9/2008 |
| JP | 2008-254855 | 10/2008 |
| JP | 4207794 | 10/2008 |
| JP | 4207796 | 10/2008 |
| JP | 4207805 | 10/2008 |

OTHER PUBLICATIONS

U.S. Appl No. 08/038,834, filed Mar. 29, 1993, Takefumi Adachi, et al.

Combined Chinese Office Action and Search Report issued Feb. 4, 2013, in Chinese Patent Application No. 201010527759.7 with English translation of category of cited documents.

* cited by examiner

DISTANCE BETWEEN 511 AND $Q_1$: $L-k\cos\omega t$
DISTANCE BETWEEN 512 AND $Q_2$: $L-k\sin\omega t$

* ONE SHEET PASSING WITHOUT ROLLER DEGRADATION

*STACKED SHEET SENDING WITHOUT ROLLER DEGRADATION

*STACKED SHEET SENDING WITH SLIGHT ROLLER DEGRADATION

*WITH MEDIUM DEGREE ROLLER DEGRADATION

*WITH SEVERE ROLLER DEGRADATION

ROTATION MEASURING MECHANISM, SHEET CONVEYANCE APPARATUS, ORIGINAL READING APPARATUS, AND IMAGE FORMING APPARATUS

CROSS-REFERENCE TO RELATED APPLICATIONS

The present application claims priority from Japanese patent application number 2009-251874, filed on Nov. 2, 2009, the entire contents of which are hereby incorporated by reference herein.

BACKGROUND OF THE INVENTION

1. Field of the Invention

The present invention relates to a rotation measuring mechanism to measure a rotation amount of a rotary member (typically a roller) by detecting a detection object rotating about a rotational axis of the rotary member in synchrony with the rotary member, and further relates to a sheet conveyance apparatus, original reading apparatus, and image forming apparatus using the rotation measuring mechanism.

2. Discussion of the Related Art

Rotation measuring mechanisms to measure a rotation amount of a rotary member such as a roller or a motor rotor have conventionally been used in various fields. For example, JP-3048685-B discloses an image forming apparatus using a rotation measuring mechanism to measure a rotation amount of a separation roller. The rotation measuring mechanism of this image forming apparatus includes a slit disc fixed to a rotation axis of the separation roller separating recording sheets fed out from a sheet feed cassette one by one and rotates together with the separation roller. The slit disc, as a detection target, is provided with a plurality of radial slits arranged at predetermined intervals in a rotation direction. A transmission photosensor provided in proximity to this slit disc has a light emitting element and a light receiving element, and directs light beams emitted from the light emitting element toward the slit disc. When the radiated light beams strike the surface of the slit disc, they are reflected, but when the slits in the slit disc are displaced to a position opposite the light emitting diode, the radiated light beams pass through the slit and are received by the light receiving element of the transmission photosensor. The transmission photosensor can detect the slit as a characteristic part of the slit disc, and the rotation amount of the separation roller can then be measured based on the number of slits detected by the transmission photosensor.

The image forming apparatus of JP-3048685-B is configured to detect slippage of a recording sheet on the surface of the separation roller based on the above measuring result. When slippage is detected, by increasing the pressing force of the separation roller against the recording sheets, the occurrence of slippage of the sheet is prevented and the feeding of multiple recording sheets simultaneously can be prevented.

In addition to the technology disclosed in JP-3048685-B, a technology is known in which a magnet as a detection target and a Hall sensor to detect magnetic force as a characteristic part of the magnet are used in combination, thereby measuring the rotation amount of the rotary member.

In recent years, with further diversification of equipment desired, it may be necessary to detect displacement in a direction perpendicular to the axis of the rotary member in addition to the rotation amount of the rotary member. For example, the image forming apparatus as disclosed in JP-3048685-B is designed to detect a thickness of the recording sheets, and therefore it may be required to detect displacement of the separation roller in the direction perpendicular to the axis. In such a case, providing another sensor to measure the roller displacement amount in addition to the sensor to measure the roller rotation amount increases the size of the apparatus, which is generally undesirable.

SUMMARY OF THE INVENTION

Accordingly, the present invention provides a novel rotation measuring mechanism capable of measuring the rotation amount of a rotary member and a displacement amount of the rotary member in the direction perpendicular to the rotation axis direction thereof.

To achieve the above object, a first aspect of the present invention provides a rotation measuring mechanism comprising a rotary member, a detection target mounted coaxially on the rotary member and rotating with the rotary member, a detector, and a processor. The detector detects the detection target, provided axially opposite the detection target, which outputs one cycle of a sine wave at each rotation of the detection target and changes amplitude of the output sine wave in accordance with displacement of the detection target together with the rotary member in a direction perpendicular to the axis of the rotary member. The processor is configured to calculate a rotation amount of the rotary member based on the detection target sine wave and the displacement amount of the rotary member in the direction perpendicular to the axis of the rotary member based on the amount of change in the amplitude of the sine wave produced by the detector.

Other exemplary aspects of the present invention are put forward in view of the above-described circumstances, and provide a novel image forming apparatus.

In one exemplary embodiment, the image forming apparatus includes an electrophotographic imaging unit and the fixing device described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE PREFERRED EMBODIMENTS

Embodiments of the present invention will now be described with reference to the drawings.

Figure 1:
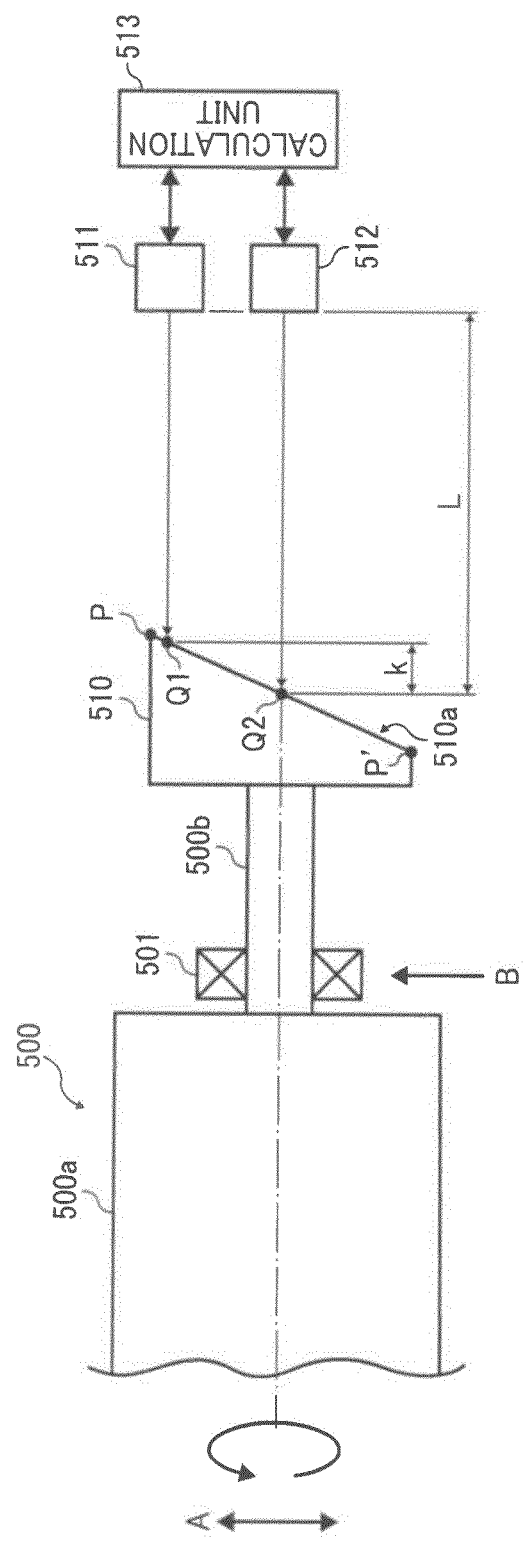
FIG. 1 is a general configuration of a roller and its vicinity, in which a rotation amount and a displacement amount in the direction perpendicular to the axis line of the roller are measured.

FIG. 1 shows a roller, a rotary member and the roller's peripheral portion. The rotation amount and displacement amount in the direction perpendicular to the axis line are to be measured. As illustrated in FIG. 1, the roller 500 as the rotary member includes a roller portion 500a and rotation axis members 500b. The rotation axis members 500b are provided at both end surfaces of the roller portion 500a, each of which extending from the end surface of the roller portion 500a. The rotation axis members 500b are rotatably supported by a roller bearing 501. The roller bearing 501 is supported by a holding means, not shown, so as to be slidable in an arrow A direction in FIG. 1, which is a direction perpendicular to the axis line. In this state, when the roller bearing 501 is pressed in an arrow B direction (vertically upward direction) by a spring, not shown, the roller portion 500a of the roller 500 contacts a second roller, not illustrated, which normally exists at an upper side of the roller 500, thereby forming a nip.

Figure 2:
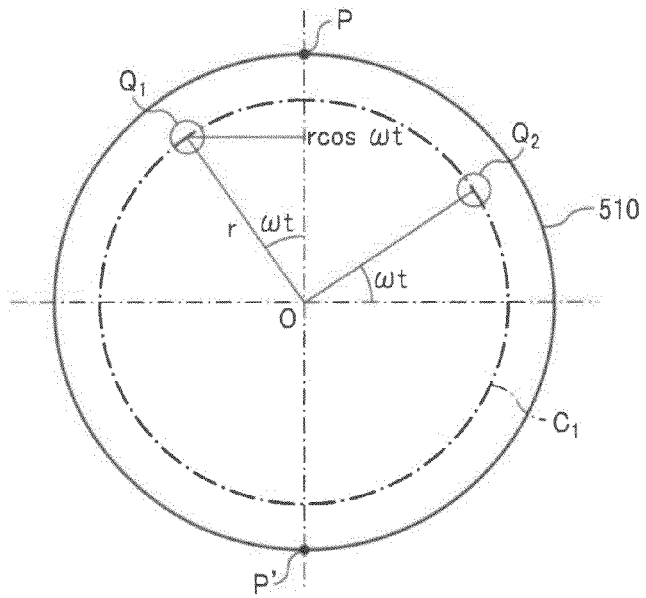
FIG. 2 is a schematic diagram illustrating a virtual circle positioned on a measuring point.

A detection target 510 is fixed at an end of the rotation axis member 500b of the roller 500. This detection target 510 rotates about the rotation axis of the rotation axis member 500b in synchrony with the roller 500. The side surface of the detection target 510 is a slanted surface 510a. As illustrated in FIGS. 1 and 2, this slanted surface 510a includes a diameter virtual line P-P' taken along a predetermined position in the rotation direction of the detection target 510 present at a peripheral portion thereof. The slanted surface has a positional relation with a first range sensor 511 and a second range sensor 512, which will be described later, such that a point P being one end of the diameter virtual line P-P', is nearest the first and second range sensors 511 and 512, and a point P', another end of the diameter virtual line P-P', is farthest from the first and second range sensors 511 and 512.

As illustrated in FIG. 1, the first range sensor 511 and the second range sensor 512 are provided at a side of the detection target 510. These sensors detect a distance to the slanted surface 510a that is a detection target using a known technology such as infrared ray irradiation, and output a predetermined voltage according to the detection result. As illustrated in FIG. 2, with a rotation axis (that is, a point O position) of the roller 500 set as a center, points (a first observation point $Q_1$ and a second observation point $Q_2$) on the slanted surface symmetric with respect to the O position and separated 90 degrees from each other are arranged and are to be detected. The first observation point $Q_1$ in the slanted surface 510a as illustrated in FIG. 1 is detected by the first range sensor 511. The second observation point $Q_2$ on the slanted surface 510a is detected by the second range sensor 512. Various methods are available to detect the distance, and an optical system, an ultrasonic system, an eddy current system, an electrostatic capacity system and the like may be selected for use depending on the detection sensitivity, application, and detection environment.

The distance between the first range sensor 511 and the first observation point $Q_1$ and the distance between the second range sensor 512 and the second observation point $Q_2$ are different depending on the rotation angle position of the detection target 510. However, the distance between the origin O, the rotation center on the slanted surface 510a, and each sensor is always the same regardless of the rotation angle position of the detection target 510. The distance between each sensor and the origin O in the rotation axis direction is represented by a distance "L".

FIG. 2 shows a virtual circle $C_1$ in the surface perpendicular to the rotation axis line with a center point O (or 0 in the coordinates) set as a center and passing both the first observation point $Q_1$ and the second observation point $Q_2$. The radius of the virtual circle $C_1$ is represented by "r". In addition, the distance between the first observation point $Q_1$ or the second observation point $Q_2$ and the center point O in the rotation axis direction is represented by "k" (see FIG. 1), which represents a slant of the slanted surface 510a. When the rotation angular speed of the detection target 510 is represented as "ω" and a time "t", respectively, the constituent of the first observation point $Q_1$ with respect to the diameter line of the virtual circle $C_1$ corresponds to "r cos ωt".

Figure 3:
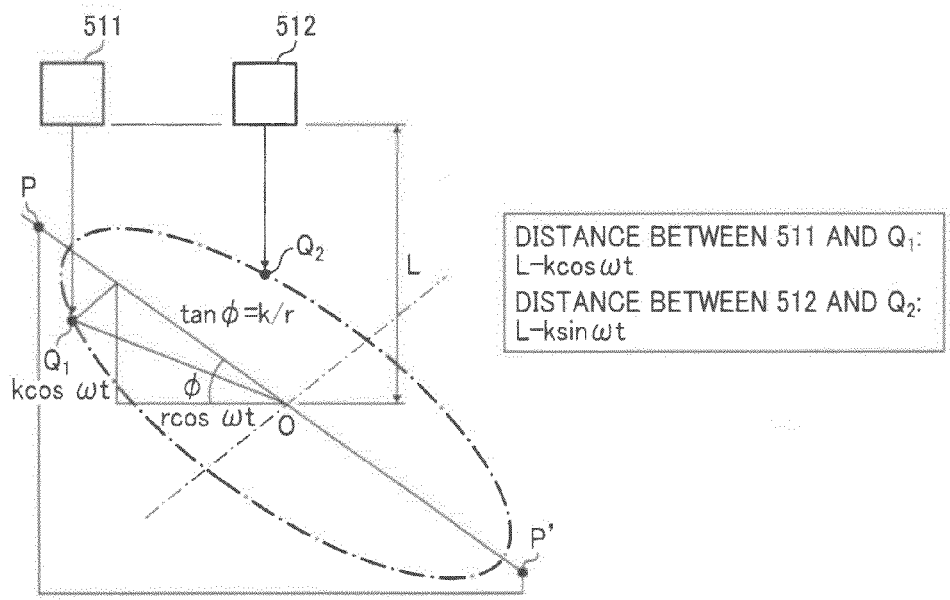
FIG. 3 is a cross-sectional view of a detection target at a position passing through a diameter of the virtual circle.

FIG. 3 is a cross section of the detection target 510 in the position passing the diameter line of a virtual circle $C_1$. A slanted angle φ of the rotation axis of the slanted surface 510a with respect to the perpendicular surface has a relation: "tan φ=k/r". Accordingly, the change in the distance at the first observation point $Q_1$ at time "t" for the distance "L" is obtained by: "−r cos ωt*tan φ=−k cos ωt". At the same time, the change in the distance at the second observation point $Q_2$ is obtained by: −k sin ωt. Then, the detection result by the first range sensor 511 varies over time according to the formula "L−k cos ωt". In addition, the detection result by the second range sensor 512 varies over time according to the formula "L−k sin ωt".

Figure 4:
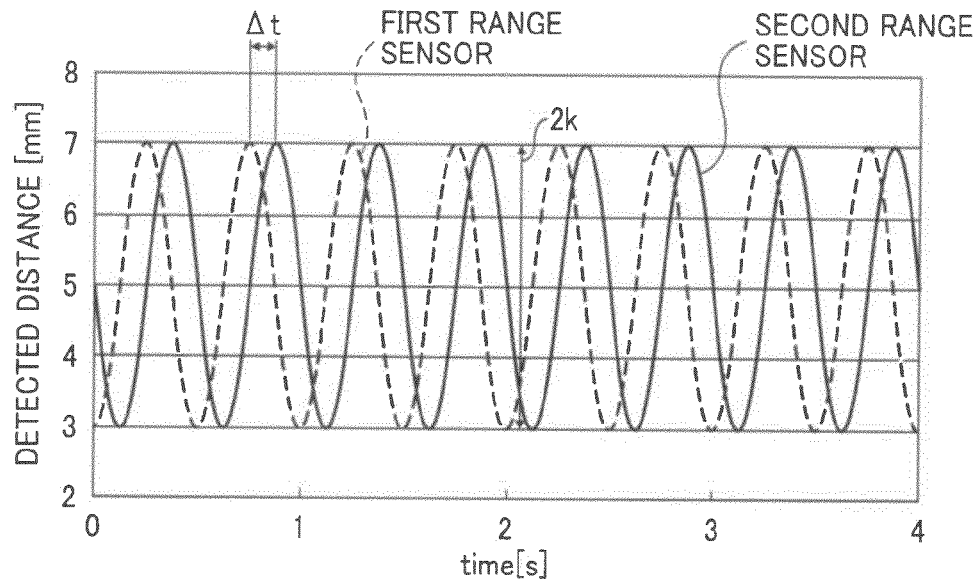
FIG. 4 is a graph illustrating a change over time of the detection result by a range sensor.

FIG. 4 shows a graph showing detection results obtained by the range sensors over time. This graph is generated based on the data obtained by a rotation measuring test under the conditions: the distance L=5 mm, k=2 mm, and the rotation amount n=120 rpm. Both the output from the first range sensor 511 and the output from the second range sensor 512 are repetitive pulses of sinusoidal waves. This shows that the distance between the sensor and the observation point varies with a characteristic to draw a sinusoidal wave of one cycle. The peak-to-peak distance of the sinusoidal wave is twice the distance "k", and ω*Δt=90°. Here, from given "tan ωt=sin ωt/cos ωt", based on the ratio of the results obtained by subtracting respective distances L from both outputs, tan ωt may be obtained. This tangent amount repeats a plain increase in the 180° cycle in a range from −90° to +90° in the coordinates of the perpendicular surface with the origin O set as a center. By observing relative magnitudes of the sine and the cosine similarly in the other angular ranges, a single value as to the sinusoidal wave may be obtained in a range from 0° to 360°. (Strictly speaking, the tangent wave becomes discontinuous at 90° and 270°, and therefore, the inverse number of the tangent value needs to be applied in the appropriate range.) This means that the rotation angle position can be obtained regardless of whether the roller 500 (or the detection target 510) is moved or rotated or not.

A calculation unit 513 of the rotation measuring mechanism, which is constituted by the detection target 510, two range sensors 511 and 512, and the like according to the present embodiment, is configured to obtain a rotation angle position of the roller 500. This rotation angle position shows at which rotation angle position the point P outputting a +side peak of the sine wave of the detection target 510 exists with the origin O set at the center.

Figure 5:
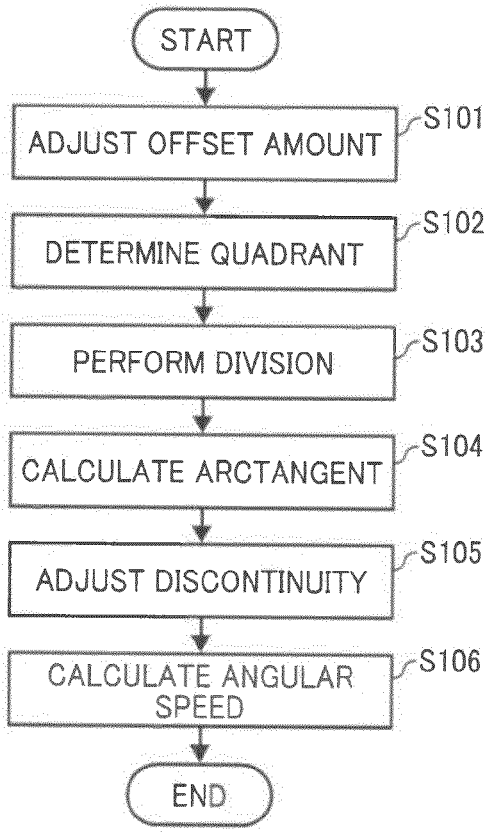
FIG. 5 is a flowchart showing steps in calculation of the rotation angle performed by a calculation unit of the rotation measuring mechanism according to the present embodiment.
Figure 6:
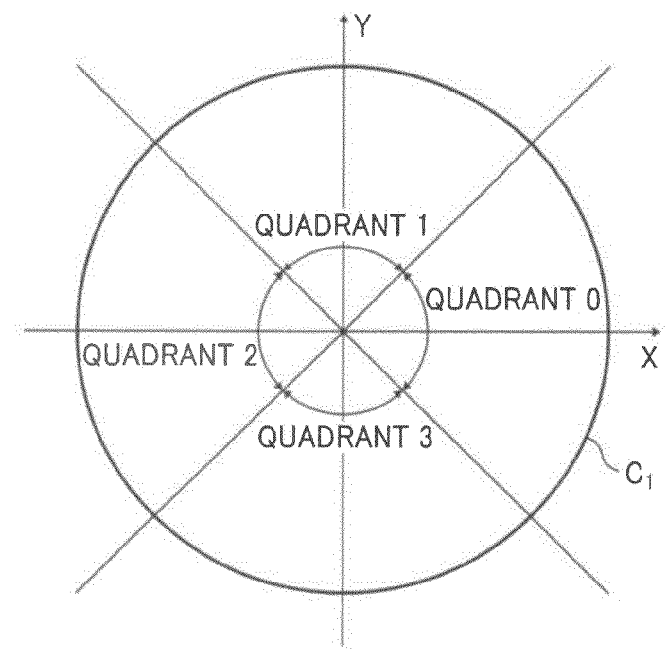
FIG. 6 is a schematic diagram showing a quadrant on the 2-dimensional coordinates with the origin O set as a center.

When obtaining a rotation angle, as illustrated in the steps of FIG. 5, first, an offset adjustment is performed (in Step 101) (hereinafter, to be abbreviated as S101). The offset adjustment is performed to adjust variations in sensitivity of each sensor product. Specifically, the value L (one half of the peak-to-peak value of the waveform) is subtracted.

Next, a quadrant determination is performed (S102). Specifically, at rotation angle positions of 90° and 270°, the tangent wave becomes discontinuous and the reciprocal needs to be obtained. Then, based on the determination condition as shown in Table 1, whether the point P is in the quadrant 0 (−45° to +45° or so), in the quadrant 1 (+45° to +135° or so), in the quadrant 2 (+135° to +225° or so), or in the quadrant 3 (+225° to −45° or so).

TABLE 1

| Quadrant | Determination condition | Calculation formula | Initially set angle |
|---|---|---|---|
| 0 | $|X| \geq |Y|$ and $X \geq 0$ and $X \neq Y$ | Y/X | −45° |
| 1 | $|X| \leq |Y|$ and $Y \geq 0$ and $X \neq -Y$ | X/Y | 45° |
| 2 | $|X| \geq |Y|$ and $X < 0$ and $X \neq Y$ | Y/X | 135° |
| 3 | $|X| \leq |Y|$ and $Y < 0$ and $X \neq -Y$ | X/Y | 225° |

Next, division is performed (S103). According to the determination results in the quadrant determination, the calculation result is made to be within ±1. As shown in Table 1, the tangent value or the reciprocal of the tangent value is calculated based on the output ratio of the two range sensors 511 and 512. Then, in the arctangent calculation (S104), after the quadrant is determined by obtaining the rotation angle position, a total rotation angle is obtained if the rotation is more than one cycle in the discontinuity adjustment (S105). Successively, in the angular speed calculation (S106), change in the rotation angle position over time is differentiated and transformed into the angular speed. Based on the total rotation angle obtained in S105, the rotation amount of the roller 500 can be determined.

Next, a method to obtain a displacement amount of the roller 500 in the direction perpendicular to the axis line will now be described.

Figure 7:
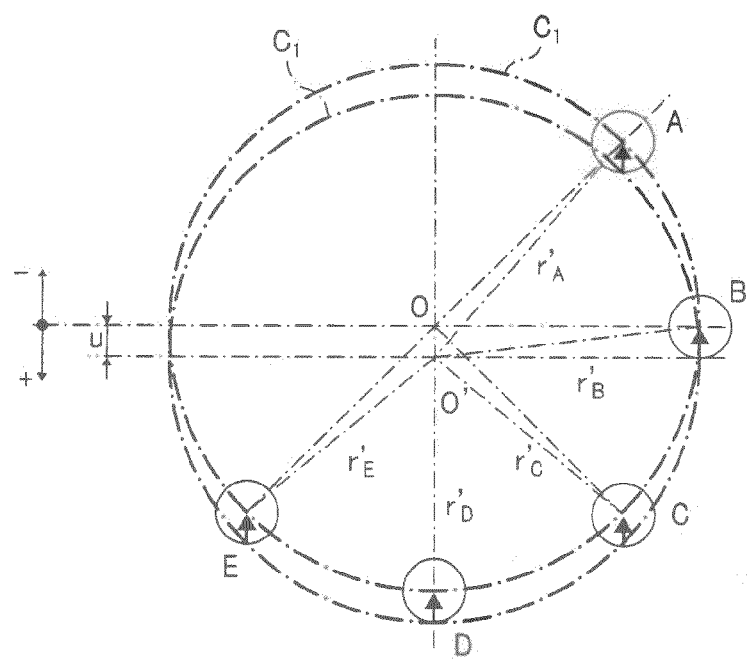
FIG. 7 is a schematic diagram showing a relation between a virtual circle after displacement and an observation point.

When a sheet (that is, a recording sheet or an original sheet) is inserted in a nip formed by contact between the roller 500 and the second roller, not shown in the figure, the roller 500 moves downwards by an amount equal to the thickness of the inserted sheet. The displacement amount of the roller 500 downward is set as a plus displacement amount, and the displacement amount is obtained. Here, as illustrated in FIG. 7, it is assumed that the origin O of the virtual circle $C_1$ moves from O to O' as a result of the roller 500 displacing downwards by a displacement amount "u".

As an easy illustration, assume that five range sensors are provided, each targeting a point shifted by 45 degrees from each other. Before the displacement, five points A to E are provided on the virtual circle $C_1$ with the origin O set as a center, and the first to fifth range sensors are configured to detect the points A to E, respectively. When the roller 500 moves downwards by the displacement amount "u", the virtual line $C_1$ moves downwards accordingly, and the center point comes to the position O' in the figure. However, the positions of the points A to E do not change because the first to fifth range sensors do not move. Accordingly, if the observation points do not change even though the virtual line $C_1$ moves downwards, there may be difference in the distance from each of the observation points A to E to the origin O' before and after the displacement. Each distance (=observation radius) represented by $r'_A$, $r'_B$, $r'_C$ and $r'_D$ may be calculated by following formulae 1 through 4:

$$r'_A = \sqrt{r^2 + \sqrt{2}ru + u^2}$$ [Formula 1]

$$r'_B = \sqrt{r^2 + u^2}$$ [Formula 2]

$$r'_C = \sqrt{r^2 - \sqrt{2}ru + u^2}$$ [Formula 3]

$$r'_D = r - u$$ [Formula 4]

Figure 8:
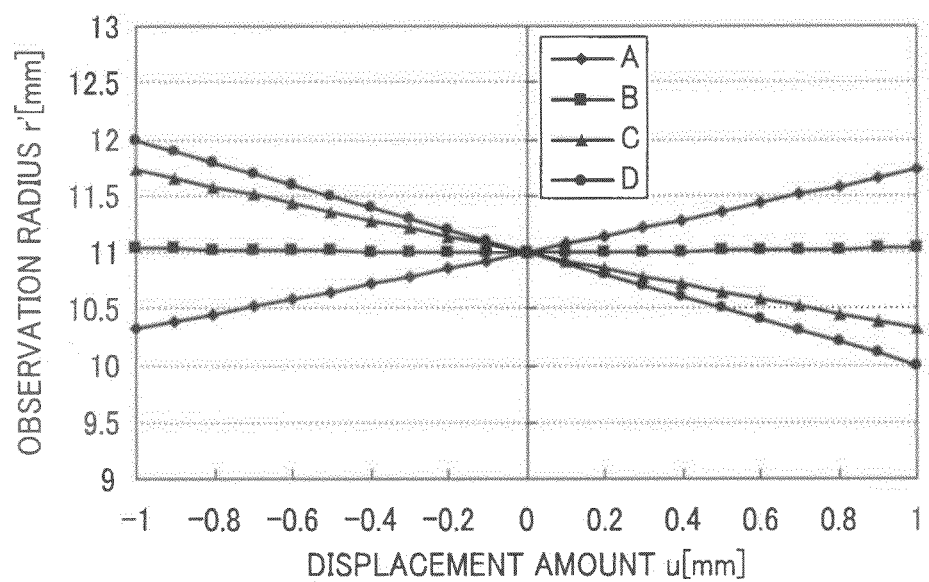
FIG. 8 is a graph showing a relation between an observed radius and a displacement amount of the roller.

FIG. 8 is a graph showing a relation between the observation radius r' at each observation point and the displacement amount u of the roller in the axis-line perpendicular direction. This graph is taken based on the test results under the test condition in which the radius r from the origin O before displacement to each observation point is set to be 11 mm. As illustrated in FIG. 8, the graph shows that the magnitude and orientation of the slant are different depending on the position of the observation point. Although the line of the observation point A shows a positive gradient, the lines of the observation points C and D show negative gradients. Also, there is no gradient in the line of the observation point B.

As described above, in the actual rotation measuring mechanism, two range sensors only are used and arranged at symmetrical positions with an angle of 90 degrees. There are three combinations of the observation points by two range sensors 511 and 512 satisfying the relation described above. They are the observation point A and C, the observation point B and D, and the observation point C and E, each of which is called an observation point pair.

Figure 9:
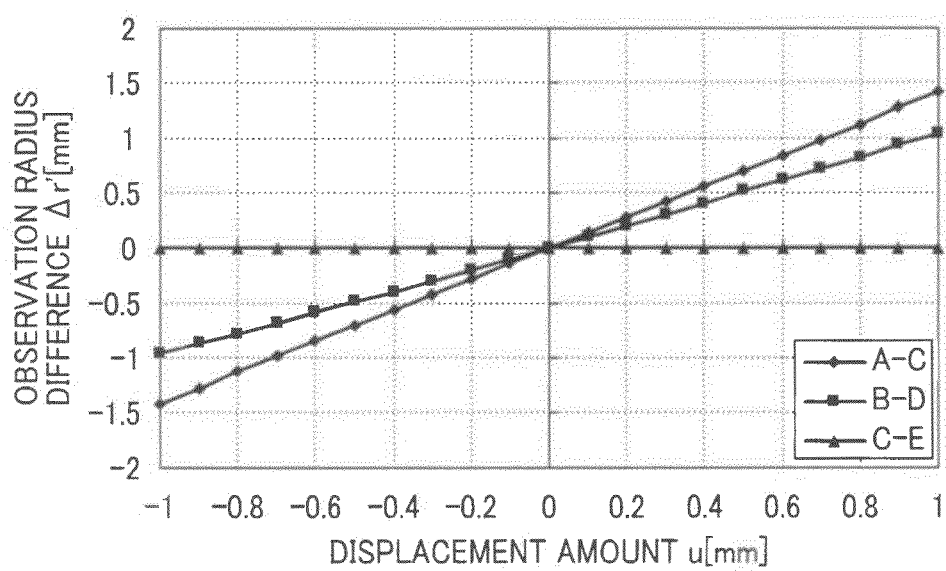
FIG. 9 is a graph showing a relation between the observed radius difference and the displacement amount of roller at each observed point pair.

FIG. 9 is a graph showing a relation between the observation radius difference Δr' and the roller's displacement amount u. The graph in FIG. 9 showing the relation between the observation radius difference Δr' and the roller's displacement amount u includes lines of different gradient depending on the positions of the observation point pair. It can be observed that the detection precision of the displacement amount u is different depending on the positions of the observation point pair. The observation point pair including the observation points C and E show no inclination in line, and therefore, cannot obtain the displacement amount u from the observation radius difference Δr'. By contrast, the observation point pair formed of the observation point A and the observation point C and the observation point pair formed of the observation points B and D can provide lines with gradients as illustrated in FIG. 9, and can obtain the displacement amount u from the observation radius difference Δr'. Among them, the observation point pair A-C shows a steeper slope and can obtain the displacement amount u with higher precision. Regarding the observation radius r' after roller displacement, a relation of "k'=kr'/r" stands from the principle of "tan φ=k/r=k'/r'". Therefore, the change in the r' appears as a change in amplitude of the sine wave output from the range sensor. Accordingly, the displacement amount u can be obtained actually based on the amplitude change amount.

Then, in the rotation measuring mechanism according to the present embodiment, the first range sensor 511 and the second range sensor 512 are provided so as to realize an observation point pair formed of the observation point A and the observation point C. As illustrated in FIG. 7, this positional relation allows the observation point C to position at directly below the observation point A. More specifically, both sensors are provided along the displacement direction of the roller 500 in this positional relation.

Figure 10:
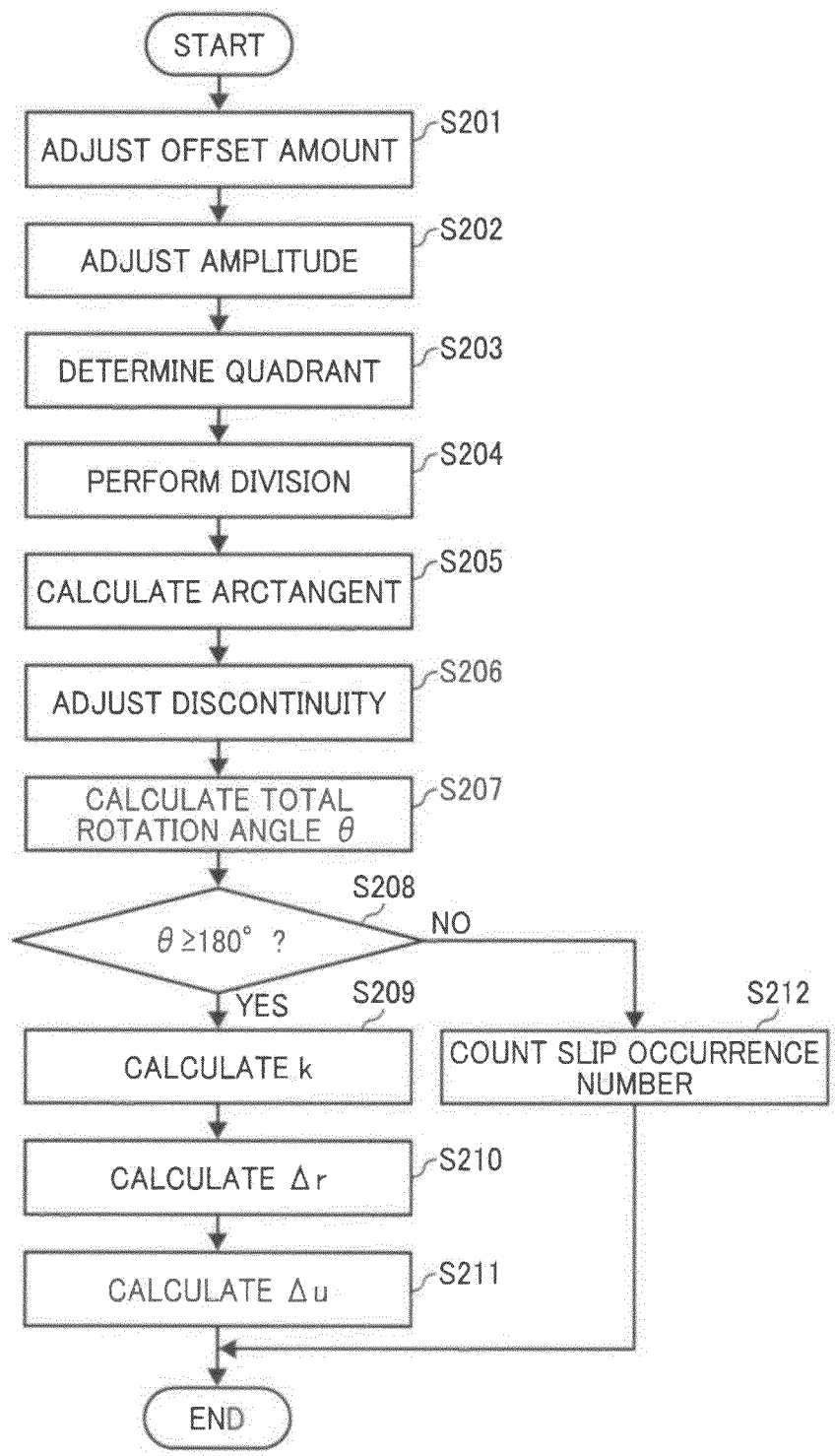
FIG. 10 is a flowchart showing steps in the displacement amount calculation process performed by the calculation unit.

FIG. 10 is a flowchart showing steps in the displacement amount obtaining process that the calculation unit 513 performs. In order to obtain the displacement amount Δu, the calculation unit 513 first performs the offset adjustment as described above (S201) and thereafter performs amplitude adjustment (S202). This amplitude adjustment is a process to prevent the amplitude changing in accordance with the displacement of the roller 500 to the axis-line perpendicular direction from adversely affecting the arctangent calculation.

After the amplitude adjustment, the quadrant determination as described above is performed (S203), which is a process to obtain the reciprocal instead of the tangent which becomes discontinuous at ±90°. Thereafter, the tangent is obtained based on the output ratio of the two range sensors by performing division operation as described above (S204). Then, a rotation angle is obtained by the arctangent calculation (S205). After the discontinuity adjustment (S206), a total of the rotation angle is obtained by calculating a total rotation angle θ (S7).

When the total rotation angle θ is calculated in S207, whether "θ≧180°" is satisfied or not is determined as to the calculation result in S207 (S208). This is to determine whether the peak value of the tangent wave can be obtained or not. Preferably, if θ≧360°, the peak-to-peak value can be obtained. If θ≧180° is satisfied, one-sided peak value can be obtained. Since the offset value does not change each time the data is obtained, if θ≧180° is satisfied, the amplitude value may be obtained. Then, if θ≧180° is not satisfied, without performing a process to calculate the displacement amount u, instead, the number of slip occurrences of the sheet in the nip is counted (S212). On the other hand, if θ≧180°, k' is calculated and the observation radius difference Δr' of the observation point pair is obtained using a relation of k/r=k'/r' (S209 and S210). Then, based on the calculation result and the graph A-C as illustrated in FIG. 9, the displacement amount Δu is calculated (S211). This displacement amount Δu represents a thickness of the sheet inserted in the nip.

In the aforementioned rotation measuring mechanism, without providing a specific sensor to measure the displacement amount Δu, the rotation angle being a rotation amount and the displacement amount Δu can be measured by the first range sensor 511 and the second range sensor 512 to measure rotated angles.

Next, modified examples of the rotation measuring mechanism will now be described. Unless otherwise specified, the structure of the rotation measuring mechanisms according to respective modified examples is identical to the embodiment as described above.

First Modified Example

In the rotation measuring mechanism according to the first modified example, a single range sensor only is provided. In the aforementioned rotation measuring mechanism in which two range sensors are provided at symmetrical positions offset at an angle of 90 degrees from each other, even though the roller 500 stops, the rotational angular position of the roller can be detected based on the difference in outputs from two range sensors. However, if the roller 500 stops, the rotational angle or the displacement amount Δu need not necessarily be obtained. If the roller 500 rotates, based on the output from even only one range sensor, the rotation angle position, the rotation angular speed and the displacement amount Δu can still be obtained.

Specifically, as illustrated in FIG. 4, among two output waveforms, the output waveform from the second range sensor 512 is considered. This output waveform being a sine wave is not flatly increasing differently from the case of tangent line. Then, it is impossible to obtain the rotation angle position directly from the output waveform. However, the differentiated waveform obtained by differentiation becomes a cosine wave, and by obtaining a ratio between both amplitude-adjusted waveforms, a tangent wave is obtained. This way, the rotational angular position may be obtained.

Figure 11:
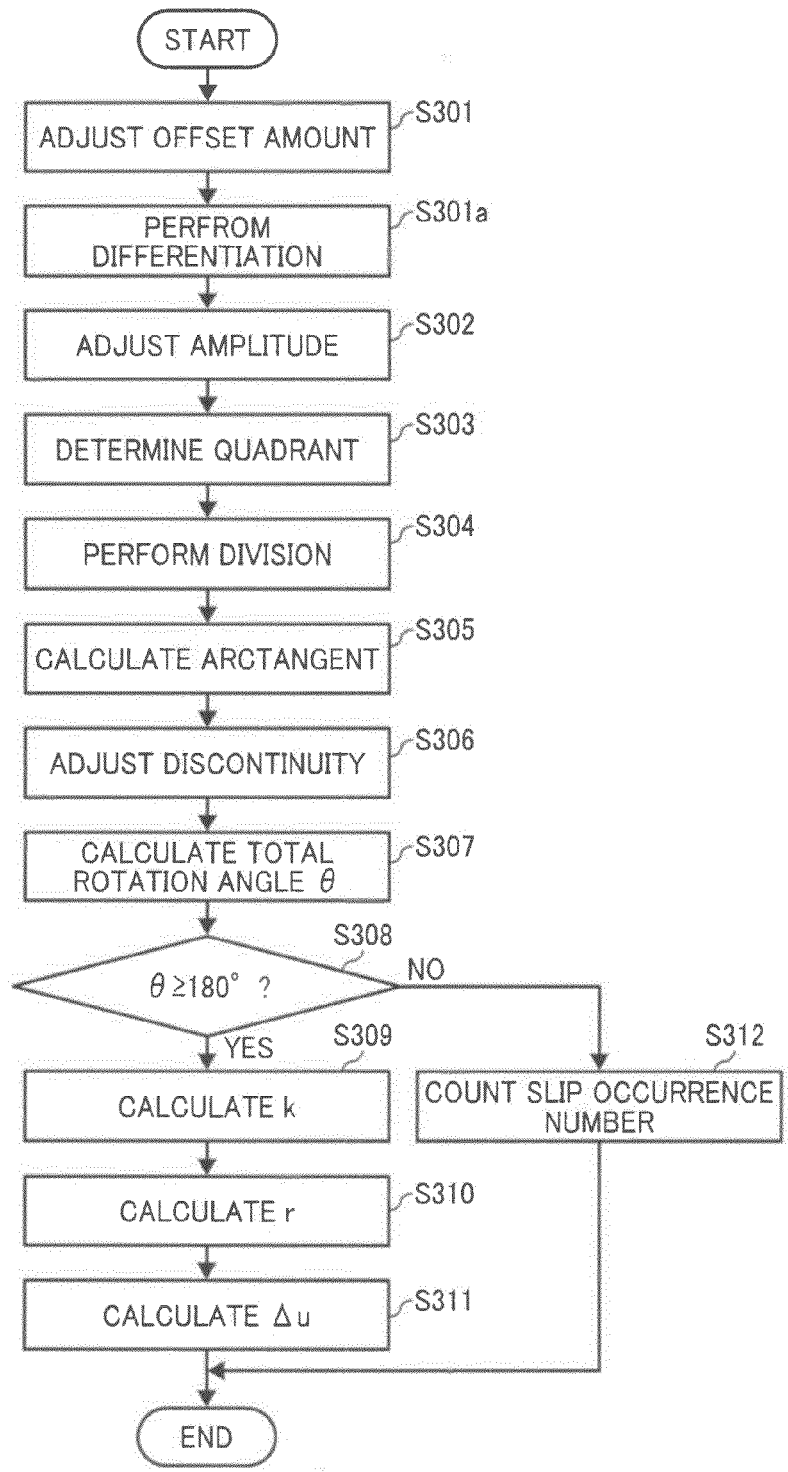
FIG. 11 is a flowchart showing steps in the displacement amount calculation process performed by the calculation unit of the rotation measuring mechanism related to a first modified example.

Then, the calculation unit 513 of the rotation measuring mechanism according to the first modified example performs a process to differentiate the sensor output. In addition, since the observation radius difference Δr' cannot be obtained from one output waveform, the observation radius $r'_A$ after displacement is obtained instead. Thereafter, based on the characteristics of the graph as illustrated in FIG. 8, the displacement amount Δu is calculated. FIG. 11 shows the steps as a reference.

Second Modified Example

Figure 12:
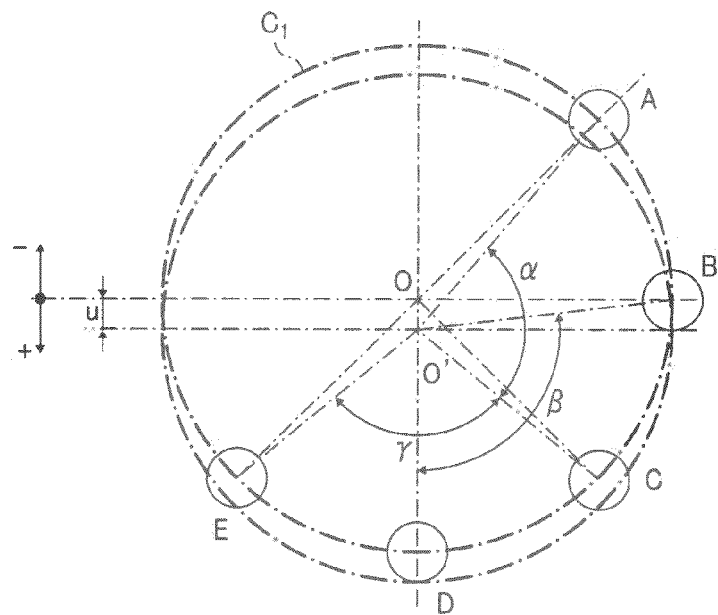
FIG. 12 is a schematic diagram illustrating an angle formed by an observation point pair after displacement and the origin.

In the rotation measuring mechanism according to the second modified example, the displacement amount Δu is obtained based on the phase shift amount of the output waveform from two range sensors, instead of obtaining the amplitude change in the output waveform from the range sensors. As illustrated in FIG. 12, this operation uses the fact that the phase difference between the two output waveforms shifts from 90° if the origin O of the virtual circle $C_1$ moves from O to O'. More specifically, the angle α in FIG. 12 becomes less than the angle AO'C. In addition, the angle β becomes less than the angle BO'D. Similarly, the angle γ becomes less than the angle CO'E. Accordingly, the angles α, β, and γ are represented by following formulae 5, 6, and 7.

$$\alpha = \tan^{-1}\left(\frac{r + \sqrt{2}\,u}{r}\right) + \tan^{-1}\left(\frac{r - \sqrt{2}\,u}{r}\right) \qquad \text{[Formula 5]}$$

$$\beta = 90° + \tan^{-1}\left(\frac{u}{r}\right) \qquad \text{[Formula 6]}$$

$$\gamma = 2 \times \tan^{-1}\left(\frac{r}{r - \sqrt{2}\,u}\right) \qquad \text{[Formula 7]}$$

Figure 13:
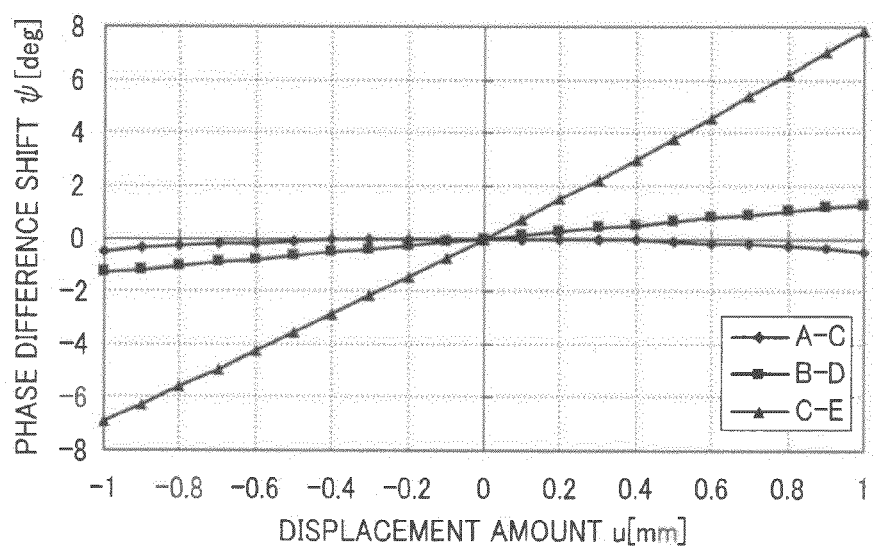
FIG. 13 is a graph showing a relation between a phase difference shift in an output from two range sensors and a displacement amount of the roller.

The value obtained by extracting 90° from each of the angles α, β, and γ is represented by a phase difference shift ψ. FIG. 13 is a graph showing a relation between the phase difference shift ω and the displacement amount u. The line A-C has almost no gradient, but the line C-E has a large gradient. From this, it can be said that the displacement amount u can be obtained with higher precision by providing two range sensors at the observation point C and the observation point E and obtaining the phase difference shift ω of both points. The phase difference corresponds to Δt in the time axis of the graph in FIG. 4, and the occurrence of the phase difference shift ψ is observed as a change in Δt.

By comparing the graphs in FIGS. 9 and 13, it can be seen that there is a line A-C having a large sensitivity to the amplitude change and a line C-E having a large sensitivity to the phase difference shift ψ, and a medium line B-D taking a medium position between both. The line A-C is preferable to obtain the displacement amount u based on the amplitude change, and the line C-E is preferable when based on the phase difference shift. Then, in the rotation measuring mechanism according to the second modified example, the two range sensors are so provided as to obtain the data of the line C-E.

Third Modified Example

Figure 14:
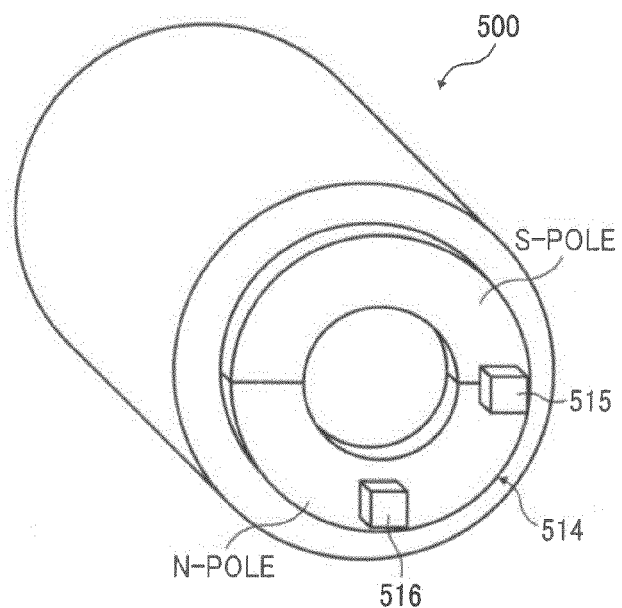
FIG. 14 is an oblique view of a roller to be detected by a rotation measuring mechanism according to a third modified example.

FIG. 14 is an oblique view of a roller 500, which is a member to be detected by the rotation measuring mechanism according to a third modified example, and a peripheral portion of the roller 500. The rotation measuring mechanism according to the third modified example employs a magnet 514 as illustrated in FIG. 14. This magnet 514 is fixed to a side surface of the roller portion of the roller 500, and rotates integrally with the roller 500 about the rotation axis of the roller 500. With the rotation axis at a center, the area from 0° to 180° is an S-pole, and the area from 181° to 360° is an N-pole. A first Hall sensor 515 and a second Hall sensor 516 each formed of Hall elements are provided at a side of the roller 500. These are provided at 90-degree symmetrical positions about the rotation axis of the roller 500 set at a center.

Figure 15:
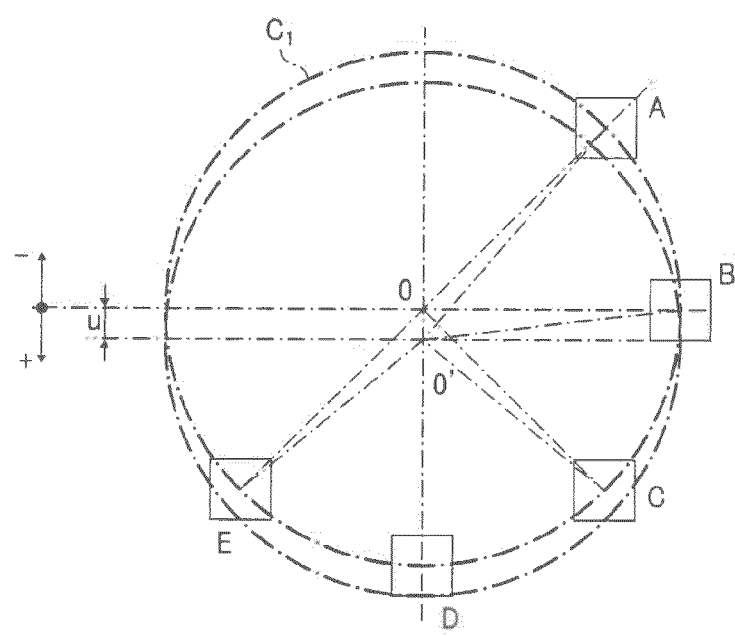
FIG. 15 is a schematic view for explaining a relation between a virtual circle and an observation point in the rotation measuring mechanism.
Figure 16:
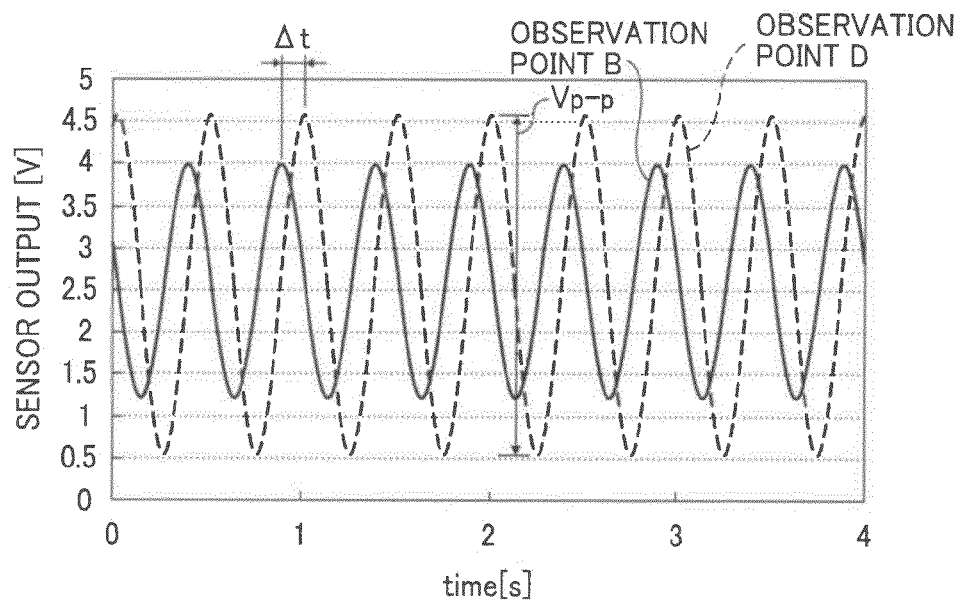
FIG. 16 is a graph showing an output waveform from two Hall sensors in the rotation measuring mechanism.

To simplify the explanation, FIG. 15 shows an example in which five Hall sensors are provided. The observation points A to E are obtained by respective Hall sensors. From this state, if the roller 500 moves downwards by a displacement amount u and its rotation center moves from O to O', amplitude changes occur in the output waveforms at the observation point B and the observation point D as illustrated in FIG. 16. The graph in FIG. 16 is generated based on the test results under the test conditions: a displacement amount u=−1.0 mm, a gap δ=4 mm, a rotation amount n=120 rpm, a surface magnetic flux density B=300 mT, and a magnet outer periphery φ=20 mm.

Figure 17:
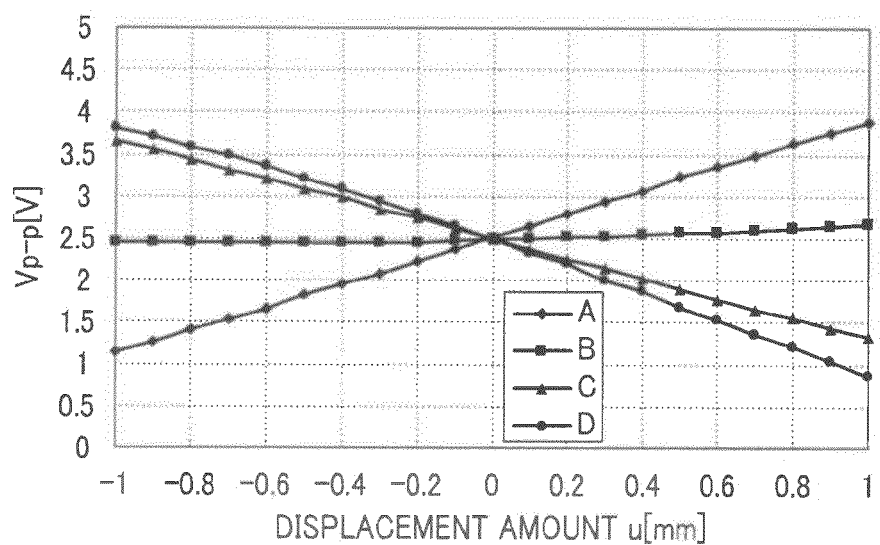
FIG. 17 is a graph showing a relation between the wave height of the output waveform and the displacement amount of the roller.

FIG. 17 is a graph showing a relation between a peak-to-peak value (Vp−p which corresponds to 2k' in FIG. 4) of the output waveform at each observation point and a displacement amount u of the roller 500. Characteristics substantially similar to the previously illustrated graph in FIG. 8 are obtained.

Figure 18:
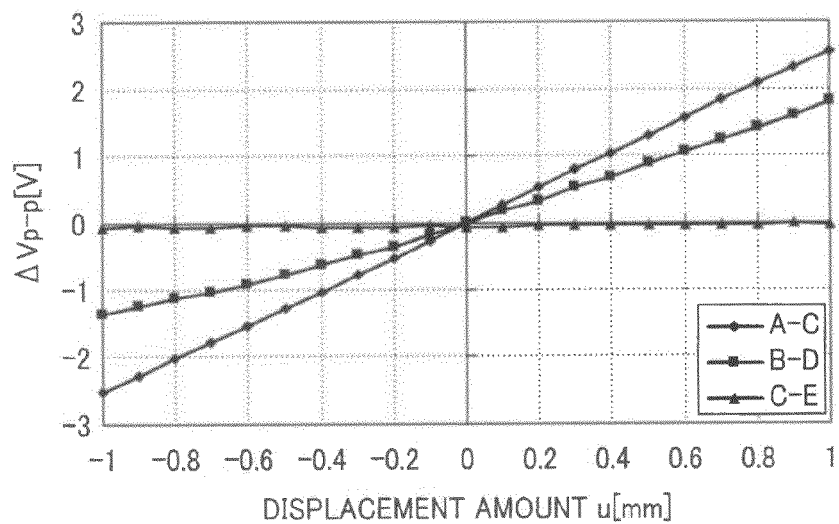
FIG. 18 is a graph showing a relation between a difference of the wave height of the output waveform and the displacement amount of the roller.

FIG. 18 is a graph showing a relation between a peak-to-peak value of the output waveform and the displacement amount u taken at each observation point pair. Characteristics substantially similar to the previous illustrated graph in FIG. 9 are obtained.

The effect of the roller displacement on the observed waveform will now be described. Here, the third modified example using the Hall sensor is described, but the same effect may be obtained with the above-described preferred embodiment according to the present invention.

Figure 19:
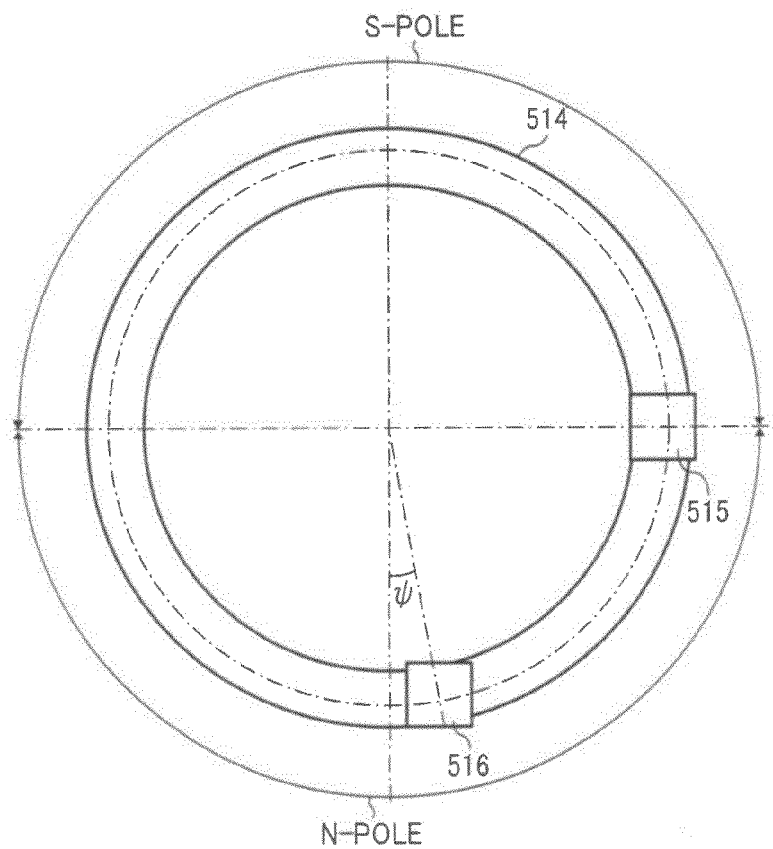
FIG. 19 is a front view showing a magnet to be detected by the rotation measuring mechanism and two Hall sensors.
Figure 20:
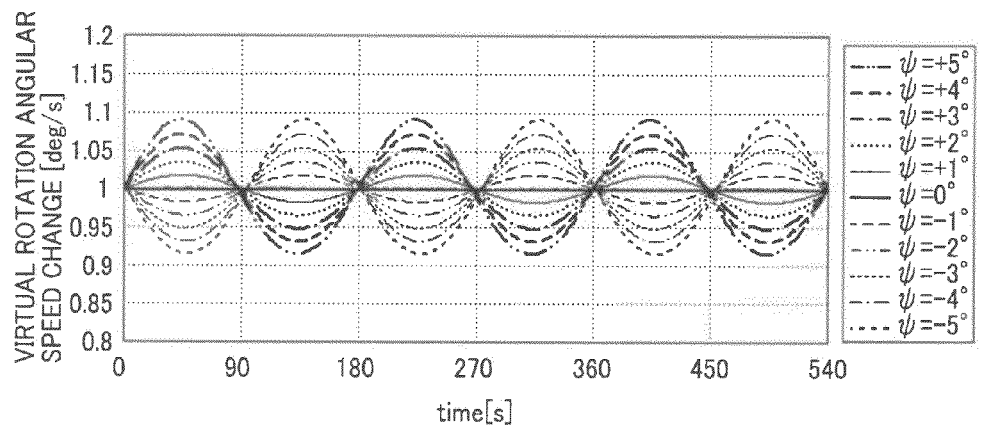
FIG. 20 is a graph showing waveforms of virtual rotational angular speed fluctuation.
Figure 21:
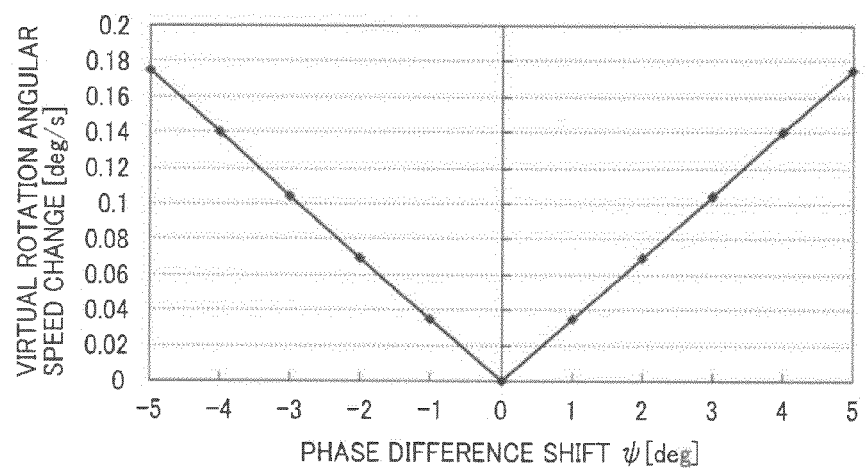
FIG. 21 is a graph showing a relation between the virtual rotational angular speed fluctuation amount and phase difference shift angle.
Figure 22:
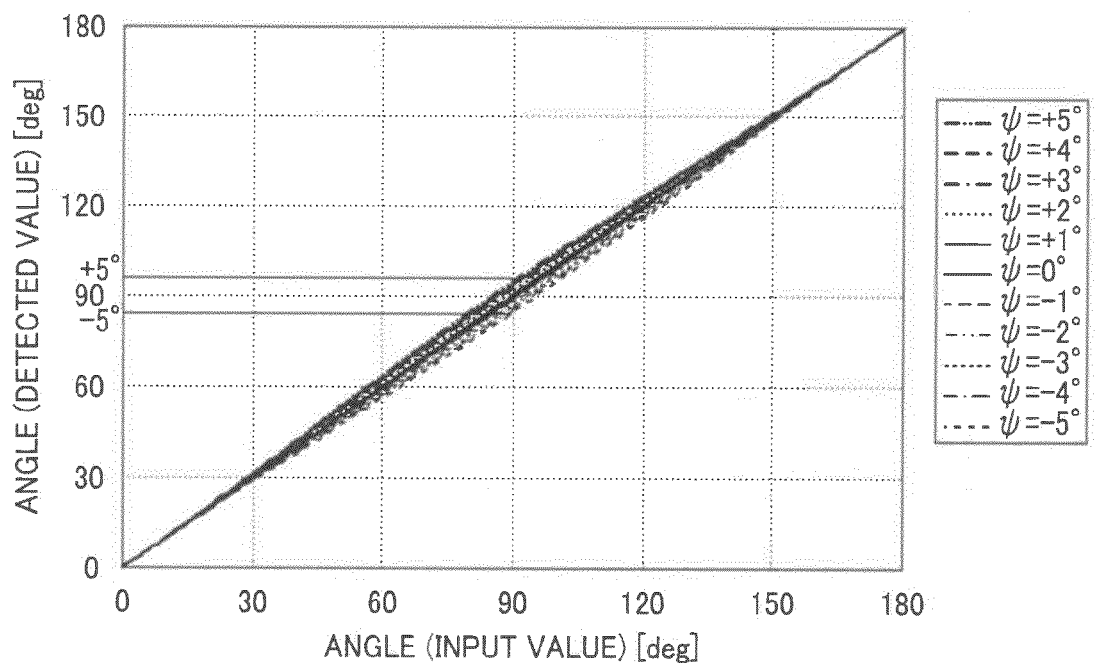
FIG. 22 is a graph showing a relation between the phase difference shift and the rotation angle.

FIG. 19 is a front view showing a magnet 514 as a detection target of the rotation measuring mechanism and two Hall sensors. A first Hall sensor 515 and a second Hall sensor 516 are provided at symmetrical positions by a predetermined angle (that is, arrangement phase shift angle) on a same virtual circle about a rotation axis of a roller, not shown. The arrangement phase shift angle is set to be "90°−ψ". If the roller, not shown, does not displace, since the Hall sensors are on the same virtual circle about the roller rotation axis, the amplitudes of the output waveforms from those Hall sensors are the same. The rotation angular speed of the roller is constant and the output waveforms from the roller show a phase difference of 90°−ψ. However, assuming that if the phase difference is not 90°, the difference from the phase difference of 90° is due to the change in the roller's rotation angular speed, and the rotation angular speed change is virtualized. Then, as illustrated in FIG. 20, virtual rotation angular speed change waveforms like sine waves with a half cycle of the waveform output from the sensors are obtained. The amplitude (wave height) is substantially proportional to the shift angle ψ as illustrated in FIG. 21. From the cumulative value of the rotation angle as illustrated in FIG. 22, at a rotation angle of 90°, substantially the same amount of error as the phase difference ψ occurs. Then, at every half rotation, the error becomes zero, which means that the error does not accumulate.

From this, it can be understood that the rotation angular speed change having double the frequency of the roller rotation cycle is erroneously detected even though the roller rotates at a constant rotation angular speed, if the center point moves from O to O' due to the roller displacement.

Then, the calculation unit 513 of the rotation measuring mechanism according to the third modified example is configured to perform a correction process to correct the detection result of the rotation angle position based on the phase difference shift, thereby correcting the rotation angular speed. After the phase difference shift amount is detected based on FIG. 13, the calculation result of the rotation angle position is corrected based on the phase difference shift amount.

Specifically, the outputs from the two Hall sensors provided with the phase difference shift ψ are represented by following two formulae 8 and 9:

$$X=\cos \omega t \quad \text{[Formula 8]}$$

$$Y=\sin(\omega t-\phi) \quad \text{[Formula 9]}$$

In addition, a following formula 10 stands using Addition Theorem.

$$Y=\sin \omega t \cos \phi - \cos wt \sin \phi \quad \text{[Formula 10]}$$

Base on the formula 10, a next formula 11 is obtained.

$$Y/X=\tan \omega t^*\cos \phi - \sin \phi \quad \text{[Formula 11]}$$

Accordingly, a following relation stands:

$$\tan \omega t=(Y/X+\sin \phi)/\cos \phi \quad \text{[Formula 12]}$$

It is understood that the rotation angle position can be represented using Y/X, which is a ratio of sensor outputs, and the phase difference shift. Other than this, there is another method to remove a half cycle variation using a bandpass filter.

Figure 23:
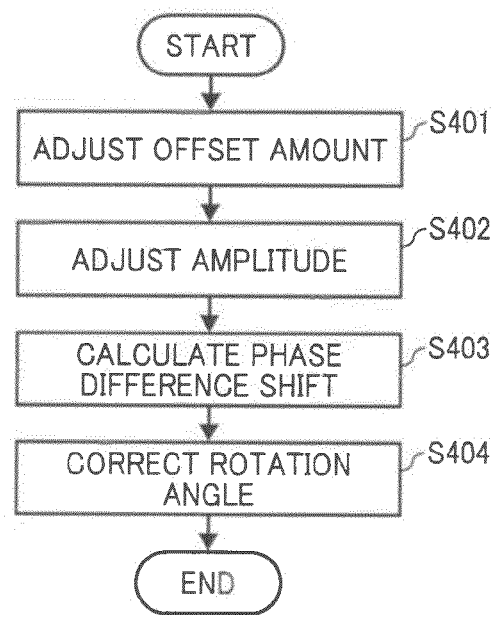
FIG. 23 is a flowchart showing steps in a rotation angle correcting process performed by the rotation measuring mechanism according to a third modified example.

FIG. 23 is a flowchart showing steps in the rotation angle correction process to be performed by the rotation measuring mechanism according to the third modified example. In the rotation angle correction process, similarly to the steps in FIG. 10, the offset adjustment (S401) and the amplitude adjustment (S402) are performed. Next, a phase difference shift calculation process to calculate the phase difference shift is performed (S403). In this phase difference shift calculation process, either of a process to obtain a phase difference shift time Δt as illustrated in the graph of FIG. 4 or a process to obtain difference in the outputs from the first range sensor 511 and the second range sensor 512 is performed.

The process to obtain the phase difference shift time Δt in the step S403 is specified as follows. In this case, the rotation speed is considered to be constant. Then, an angular speed ω is obtained based on the cycle of one waveform among output waveforms from two range sensors. Then, from a relation "ψ=ω*Δt−90°", the phase difference shift time Δt is obtained.

Figure 24:
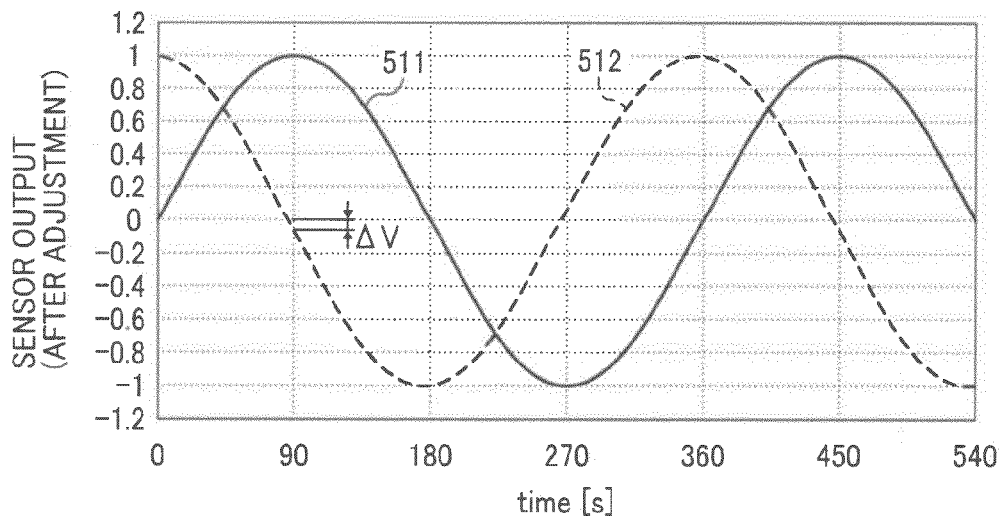
FIG. 24 is a graph illustrating output difference ΔV of two sensors.

When the process to obtain the shift in the outputs from the two range sensors is performed in step S403, the related process is as follows. First, among the output waveforms from two range sensors 511 and 512 as illustrated in FIG. 24, it is obtained how much shift exists between both outputs using either of the outputs as a reference. For example, when one shows a maximum value of 1, the other should be 0 ideally. But if there is a phase difference shift, the output difference ΔV occurs. If the reference output waveform is a sine wave, the other should be a cosine wave. Then, based on the relational expression "ΔV=cos(90°−ψ), the output difference ΔV may be calculated.

In S403, the phase difference shift time Δt or the output difference ΔV are calculated, and based on the obtained value, the phase difference shift amount ψ may be obtained. Then, ωt value is obtained based on the relational expression "tan ωt=(Y/X+sin ψ)/cos ψ" (S404).

Fourth Modified Example

Figure 25:
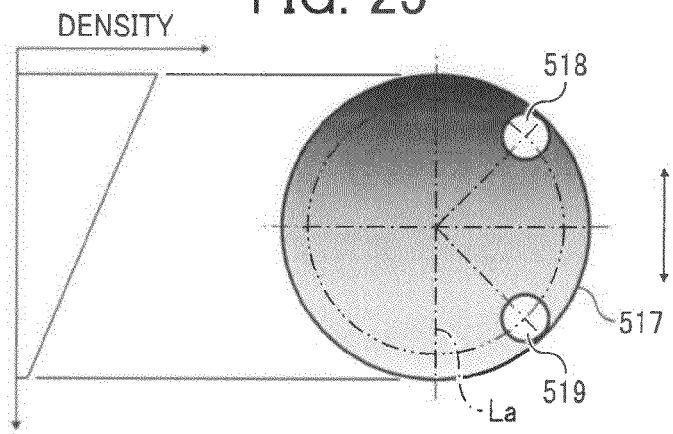
FIG. 25 is front view showing a detection target in the rotation measuring mechanism according to a fourth modified example and first and second density sensors.

FIG. 25 is a front view showing a detection target 517, a first density sensor 518 and a second density sensor 519 in the rotation measuring mechanism according to a fourth modified example. The rotation measuring mechanism according to the fourth modified example uses the detection target having a gradient in the density as illustrated in the figure. This density gradient is applied to a diameter virtual line La extending at a predetermined position in the rotation direction of the detection target 517 so that one end portion of the line La has a highest density and another end portion of the line La has a lowest density. Such a density gradient is applied to the surface of the detection target 517 opposite the sensors.

The first density sensor 518 and the second density sensor 519, each formed of a reflection type photosensor, are arranged so as to detect the positions rotated about a rotation axis of the detection target 517 phase-shifted by 90°, and each outputs voltage corresponding to the reciprocal of the density of each position. In the combination of the detection target 517 and the density sensors, sine wave-like outputs of one cycle are output per one revolution of the roller. The reflecting density need not be a linear change. If a linear change can be obtained by providing any transformation, any type may be used similarly. The relative positions of two density sensors are obtainable from the observation points A and C.

Figure 26:
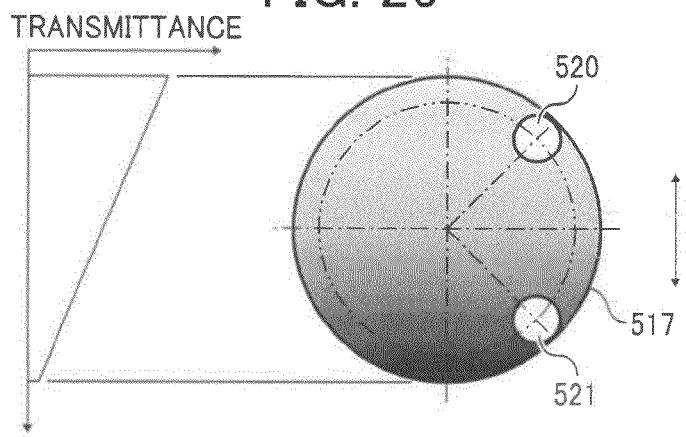
FIG. 26 is a front view showing another example of a density sensor together with a detection target.

Instead of the first density sensor 518 and the second density sensor 519 each formed of the reflection type photosensor, a first density sensor 520 and a second density sensor 521, each formed of a transmission photosensor, may be used as illustrated in FIG. 26. In this case, a transparent base member is used for the detection target 517. The detection target 517 is arranged between a light emitting element and a light receiving element of the sensor, and the light transmission amount with respect to the density gradient surface is detected. The voltage output from the sensor varies depending on the density.

Next, an embodiment of the image forming apparatus to which the rotation measuring mechanism according to the third modified example is mounted will now be described.

Figure 27:
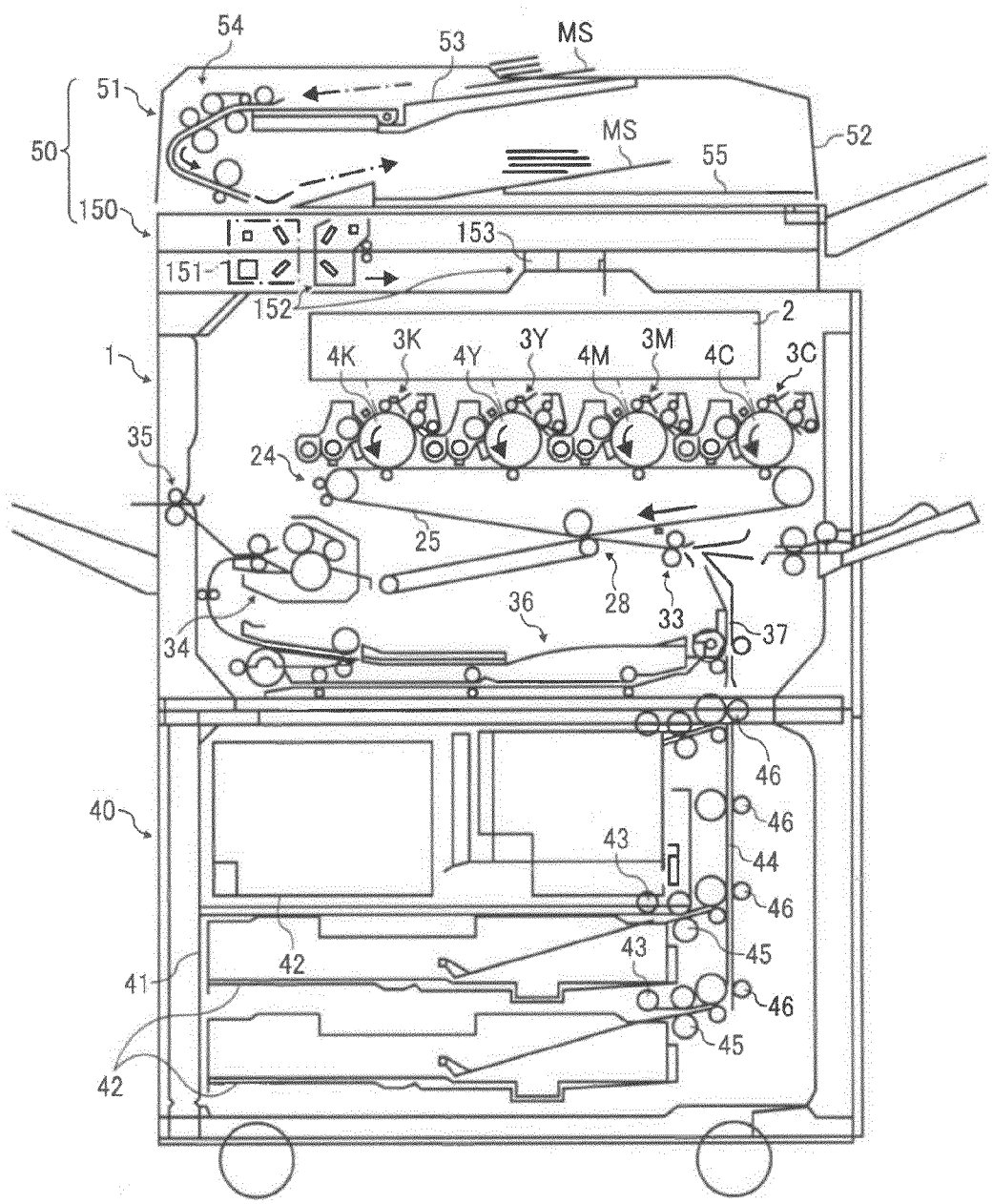
FIG. 27 is a drawing showing a general structure of a copier according to the present embodiment.

First, a basic structure of a copier according to the present embodiment will now be described. FIG. 27 shows a general configuration of the copier according to the present embodiment. This copier includes an image forming section 1, a sheet supply unit 40, and an image reading unit 50. The image reading unit 50 includes a scanner 150 fixed on the image forming section 1, and an automatic document feeder (hereinafter, ADF) 51 as a sheet conveyance unit supported by the scanner 150.

The sheet supply unit 40 includes two sheet feed cassettes 42 arranged as a multistage form inside a paper bank 41, delivery rollers 43 to deliver recording sheets from each of the sheet feed cassettes, and separation roller pairs 45 to separate, while conveying the delivered recording sheets, one by one. In addition, the sheet supply unit 40 includes a plurality of conveyance rollers 46 to convey the recording sheet as a sheet-shaped member to a sheet conveyance path 37 as a conveyance path of the image forming section 1.

The image forming section 1 serves as an image forming means and includes an optical writing unit 2, four process units 3K, 3Y, 3M, and 3C each forming toner images of black, yellow, magenta, and cyan (K, Y, M, and C), a transfer unit 24, a sheet conveyance unit 28, a registration roller pair 33, a fixing unit 34, a switchback unit 36, the sheet conveyance path 37, and the like. Then, light sources, such as a laser diode, and LED, not shown, provided in the optical writing unit 2, are driven to emit laser beams L toward four photoreceptors 4K, 4Y, 4M, and 4C. By this light emission, electrostatic latent images are formed on the surface of the photoreceptors 4K, 4Y, 4M, and 4C and these latent images are developed into toner images via a predetermined development process.

Figure 28:
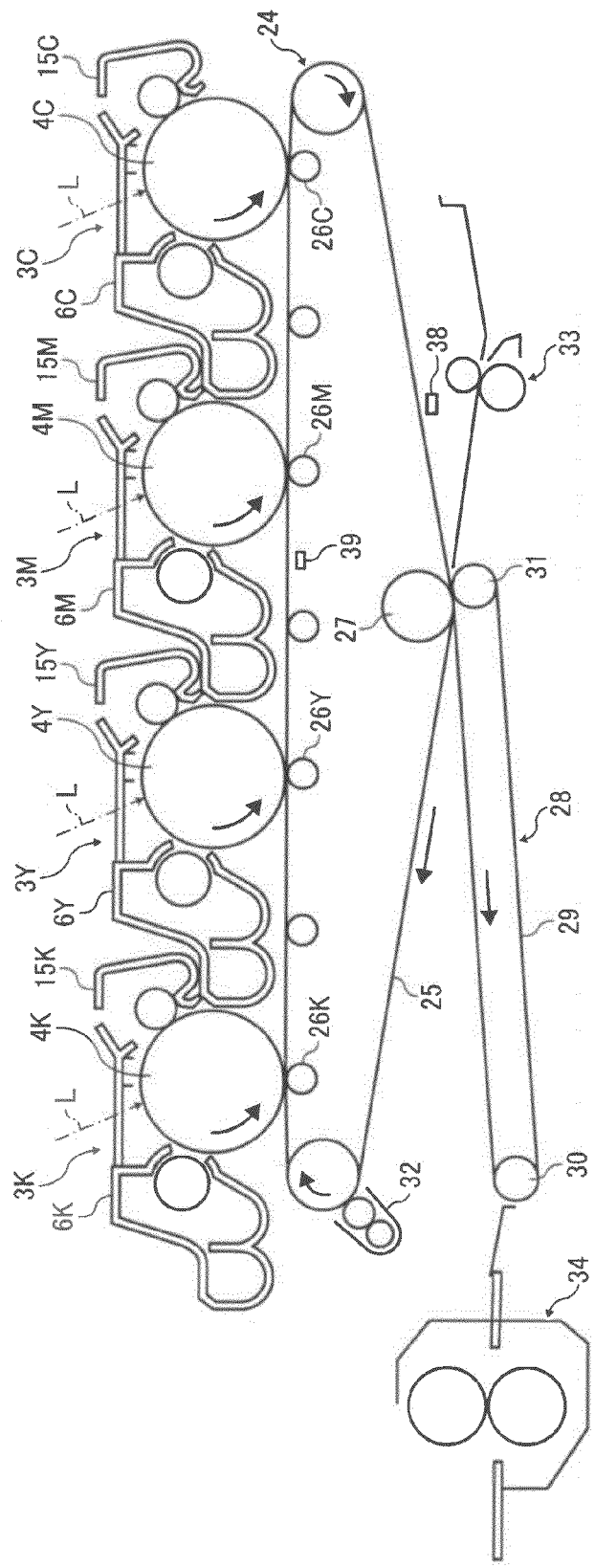
FIG. 28 is a partial enlarged view of an image forming section in the copier in FIG. 27.
Figure 29:
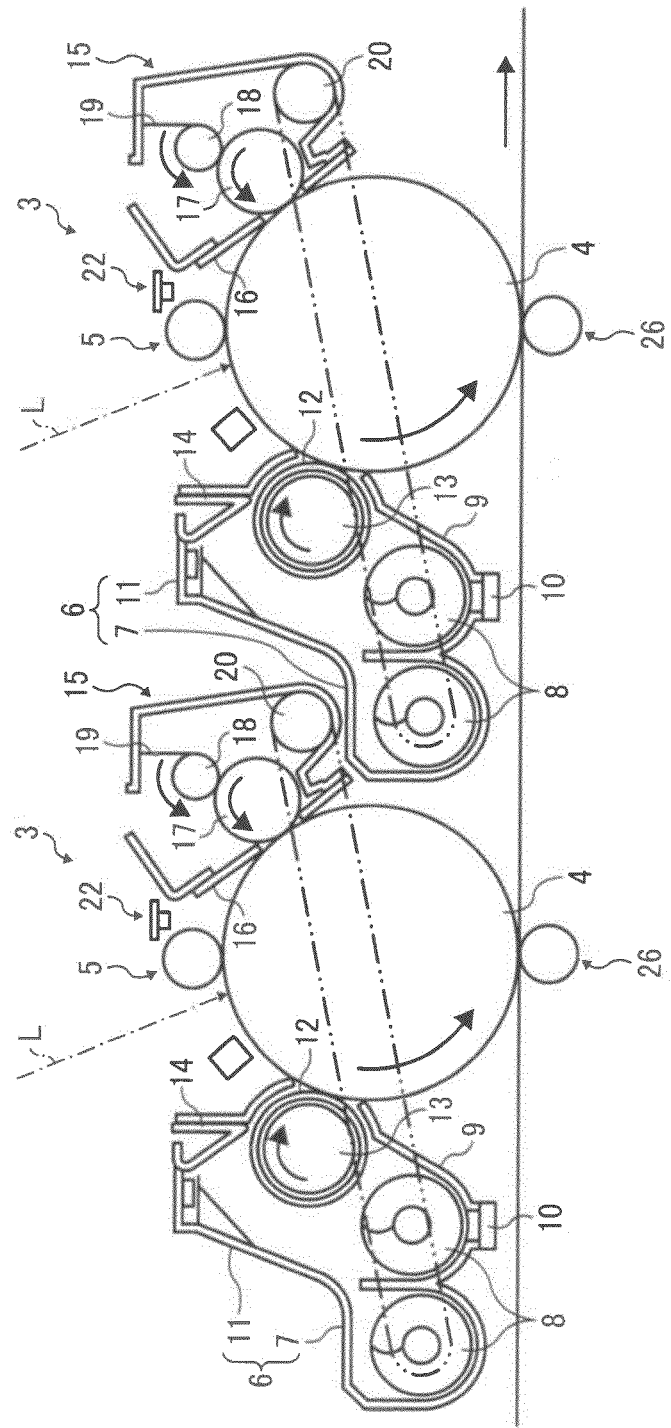
FIG. 29 is a partial enlarged view of a tandem portion including four process units in the image forming section of FIG. 28.

FIG. 28 is a partially enlarged view of an internal structure of the image forming section 1. FIG. 29 is a further enlarged view of a tandem portion formed of four process units 3K, 3Y, 3M, and 3C. Each of the four process units 3K, 3Y, 3M, and 3C has a substantially similar structure with an exception that the color of toner for use is different. Accordingly, the affixes of K, Y, M, and C are omitted in FIG. 29.

Each of the process units 3K, 3Y, 3M, and 3C includes a photoreceptor and various devices arranged around the photoreceptor, as one integral unit. Each process unit, being supported to one common support member, is detachable to the main body of the image forming section 1. Taking the process unit 3K for the color black as an example, the process unit 3K includes, around the photoreceptor 4, a charging unit 23, a developing unit 6, a drum cleaning unit 15, a discharging lamp 22, and the like. The present copier has a so-called tandem-type structure in which four process units 3K, 3Y, 3M, and 3C are arranged opposite to an intermediate transfer belt 25, to be described later, and along the endlessly moving direction of the belt 25.

The drum-shaped photoreceptor 4 includes a base tube formed of aluminum and a photoreceptor layer which is formed by coating an organic photosensitive material with a photosensitivity on the base tube. However, the photoreceptor 4 may be an endless belt-shaped one.

The developing unit 6 develops a latent image using two-component developer including magnetic carriers and non-magnetic toner to develop latent images. The developing unit 6 includes an agitating section 7 which supplies two-component developer to a developing sleeve 12 while agitating the developer included inside the developing unit 6, and a developing section 11 to cause the toner in the two-component developer carried by the developing sleeve 12 to be transferred to the photoreceptor 4.

The agitating section 7 is provided at a position lower than that of the developing section 11, and includes two conveyance screws 8 each provided in parallel to each other, a separation plate provided between these screws, and a toner density sensor 10 provided at a bottom of a developer case 9.

The developing section 11 includes the developing sleeve 12 provided opposite the photoreceptor 4 through an opening of the developer case 9, a magnet roller 13 provided non-rotatably inside the developer case 9, a doctor blade 14 of which leading edge may be closely contacted to the developing sleeve 12, and the like. The developing sleeve 12 is a rotatable non-magnetic cylinder shaped member. The magnet roller 13 has a plurality of magnetic poles sequentially arranged toward a rotation direction of the sleeve from a position opposite the doctor blade 14. These magnetic poles each exert magnetic force at predetermined positions in the rotation direction toward the two-component developer on the sleeve. According to this, two-component developer conveyed from the agitating section 7 is attracted to and carried on the surface of the developing sleeve 12, and forms a magnetic brush along the magnetic force line on the surface of the sleeve.

The magnetic brush of the developer is regulated to have a proper layer thickness when passing through a portion opposite the doctor blade 14 accompanied by the rotation of the developing sleeve 12, and is conveyed to a developing area opposite to the photoreceptor 4. Then, the magnetic brush is used contributively in the development such that the toner is transferred to the electrostatic latent image by a potential difference between the developing bias applied to the developing sleeve 12 and the electrostatic latent image of the photoreceptor 4. Further, the magnetic brush returns to an inside of the developing section 11 accompanied by the rotation of the developing sleeve 12, is separated from the surface of the sleeve by an effect of repulsive magnetic field formed between the magnetic poles of the magnet roller 13, and thereafter is returned into the agitating section 7. A proper amount of toner is replenished to the two-component developer inside the agitating section 7 based on the detection result of the toner density sensor 10. The developing unit 6 may use one-component type developer which does not include magnetic carriers, instead of the two-component developer.

The drum cleaning unit 15 is configured such that a cleaning blade 16 formed of an elastic member is pushed against the photoreceptor 4; however, another type of cleaning unit may be used. To improve cleanability, in the present embodiment, a fur brush 17 having contact conductivity is used and a peripheral surface of the fur brush 17 is brought into contact with the photoreceptor 4. The fur brush 17 rotates in a direction indicated by an arrow in the figure. This fur brush 17 also serves to scrape off a lubricant from a solid lubricant, not shown, turn it to a minute powder, and coat the powder to the surface of the photoreceptor 4. An electric field roller 18 formed of a metal which applies a bias to the fur brush 17 is so provided as to rotate in the direction indicated by an arrow in the figure. A leading edge of the scraper 19 is pushed against the fur brush 17. The toner attached to the fur brush 17 rotates in the direction opposite to that of the fur brush 17 while contacting it, and is transferred to the electric field roller 18 to which a bias is applied. The toner is then scrapped off from the electric field roller 18 by the scraper 19, and falls on a collection screw 20. The collection screw 20 conveys the collected toner toward an edge portion of the drum cleaning unit 15 in the direction perpendicular to the figure plane, and sends it to a recycle conveying unit 21 provided outside the drum cleaning unit 15. The recycle conveying unit 21 sends the conveyed toner to the developing unit 15 for a recycled use.

The discharging lamp 22 discharges the surface of the photoreceptor 4 by emitting light. The surface of the photoreceptor 4 which has been discharged is then uniformly charged by the charging unit 23, and the optical writing unit 2 performs optical writing process on the surface thereof. The charging unit 23 may use a method in which the charging roller applied with a charging bias is rotated while contacting the photoreceptor 4. However, a scorotron charger to perform a charging process without contacting the photoreceptor 4 may also be used.

As illustrated in FIG. 28, each of the photoreceptors 4K, 4Y, 4M, and 4C of the four process units 3K, 3Y, 3M, and 3C is formed with images of K toner, Y toner, M toner, and C toner, respectively, according to the processes as described above.

The transfer unit 24 is formed below the four process units 3K, 3Y, 3M, and 3C. The transfer unit 24 as a belt driving unit endlessly moves in the clockwise direction in the figure while causing the intermediate transfer belt 25, stretched over a plurality of rollers, to be contacted the photoreceptors 4K, 4Y, 4M, and 4C. Accordingly, a first transfer nip for the colors K, Y, M, and C in which the photoreceptors 4K, 4Y, 4M, and 4C contact the intermediate transfer belt 25 being an endless belt member is formed. In the vicinity of the first transfer nip for the colors of K, Y, M, and C, first transfer rollers 26K, 26Y, 26M, and 26C each provided at an inner side of the belt loop press the intermediate transfer belt 25 against the photoreceptors 4K, 4Y, 4M, and 4C. Each of these first transfer rollers 26K, 26Y, 26M, and 26C is applied with a first transfer bias from a power source, not shown. Thus, a first transfer electric field to electrostatically transfer the toner images on the photoreceptors 4K, 4Y, 4M, and 4C to the intermediate transfer belt 25 is formed on the first transfer nip for the colors K, Y, M, and C. While passing through the first transfer nip for the colors K, Y, M, and C in accordance with the endless movement in the clockwise direction in the figure, the toner images are sequentially transferred on a front surface of the intermediate transfer belt 25 primarily in an overlaying manner at each transfer nip. By this first overlaying transfer, a four-color overlaid toner image (hereinafter, four-color toner image) is formed on the front surface of the intermediate transfer belt 25.

The sheet conveyance unit 28 provided below the transfer unit 24 in the figure includes an endless belt-shaped sheet conveyance belt 29 stretched over a drive roller 30 and a secondary transfer roller 31. The intermediate transfer belt 25 and the sheet conveyance belt 29 are wedged between the secondary transfer roller 31 of the sheet conveyance unit 28 and a lower tension roller 27 of the transfer unit 24. Accordingly, a secondary nip is formed at a portion in which the front surface of the intermediate transfer belt 25 and the front surface of the sheet conveyance belt 29 contact each other. The secondary transfer roller 31 is applied with a secondary transfer bias from a power source, not shown. On the other hand, the lower tension roller 27 of the transfer unit 24 is grounded. Accordingly, a secondary transfer electric field is formed to the secondary transfer nip.

As illustrated in FIG. 28, a registration roller pair 33 is provided in a right side of the secondary nip. In addition, in the vicinity of the entrance to the registration nip by the registration roller pair 33, a registration roller sensor, not shown, is provided. A recording sheet P conveyed from the sheet supply unit, not shown, to the registration roller pair 33 stops temporarily after a predetermined time has passed since the leading edge of the sheet was detected by the registration roller sensor, and abuts the registration nip of the registration roller pair 33. As a result, the posture of the recording sheet P is corrected and a preparation to take synchronization with the image formation is made. Thus, the recording sheet P is posture-corrected, but there is also a case in which the correction can not be made satisfactorily. In such a case, a skew to the recording sheet P may occur in the downstream of the registration roller pair 33.

When the leading edge of the recording sheet P abuts the registration nip, the registration roller pair 33 restarts driving of the roller rotation at a timing to allow the recording sheet P to be synchronous with the arrival of the four-color toner image on the intermediate transfer belt 25, thereby sending the recording sheet P to the secondary transfer nip. In the secondary transfer nip, the four-color toner image on the intermediate transfer belt 25 is secondarily transferred to the recording sheet at once by the effect of the secondary transfer electric field and the nip pressure, whereby a full-color image is correlatively formed with the white color of the recording sheet P. The recording sheet which has passed through the secondary transfer nip is separated from the intermediate transfer belt 25 and is conveyed to the fixing unit 34 while being held on the front surface of the sheet conveyance belt 29 and accompanied by its endless movement. In the vicinity of an outlet of the registration nip, there is provided an optical displacement sensor 38, the function of which will be described later.

Residual toner after transfer which has not been transferred to the recording sheet in the secondary transfer nip is deposited on the surface of the intermediate transfer belt 25 which has passed through the secondary transfer nip. This residual toner after transfer is scrapped off and removed from the belt 25 by the belt cleaning unit contacting the intermediate transfer belt 25.

After the recording sheet is conveyed to the fixing unit 34, a full-color image on the recording sheet is fixed thereon by heat and pressure of the fixing unit 34. Then, the recording sheet is conveyed from the fixing unit 34 to a sheet discharge roller pair 35, and is discharged As illustrated in FIG. 27, a switchback unit 36 is provided below the sheet conveyance unit 22 and the fixing unit 34. By this switchback unit 36, the recording sheet which one-sided image fixing process has been completed is switched over by a switchover claw to a side of the recording sheet reverse unit, is reversed there and inserted again to the secondary transfer nip. After the recording sheet to which image secondary transfer process and fixing process have been performed on another side, the recording sheet is discharged onto the sheet discharge tray.

The scanner 150 fixed on the image forming section 1 and the ADF 51 fixed on the scanner include a fixed reading section and a moving reading section 152. The moving reading section 152 is provided directly below a second contact glass, not shown, fixed to a casing upper wall of the scanner 150 so provided as to contact an original MS, and is capable of moving an optical system including a light source, reflective mirror, and the like, in the horizontal direction in FIG. 27. Then, in the process to move the optical system from the left to right side, the light emitted from the light source is reflected by the original MS, not shown, placed on the second contact glass, and thereafter, the reflected light is received, via a plurality of reflective mirrors, by an image reading sensor 153 fixed to the scanner main body.

In contrast, the fixed surface reading section includes a first surface fixed reading part 151 and a second surface fixed reading part, not shown, provided in the ADF 51. The first surface fixed reading part 151 includes a light source, reflective mirrors, and an image reading sensor such as a CCD, and is provided directly below the first contact glass, not shown, fixed to the casing upper wall of the scanner 150 so provided as to contact the original MS. Then, when the original MS conveyed by the ADF, to be described later, passes by the first contact glass, the light emitted from the light source is sequentially reflected by the surface of the original MS and is received by the image reading sensor via a plurality of reflective mirrors. Accordingly, without moving the optical system formed of the light source and the reflective mirrors, the first surface of the original MS is scanned. In addition, the second surface fixed reading part 152 scans a second surface of the original MS which has passed through the first surface fixed reading part 151.

Figure 30:
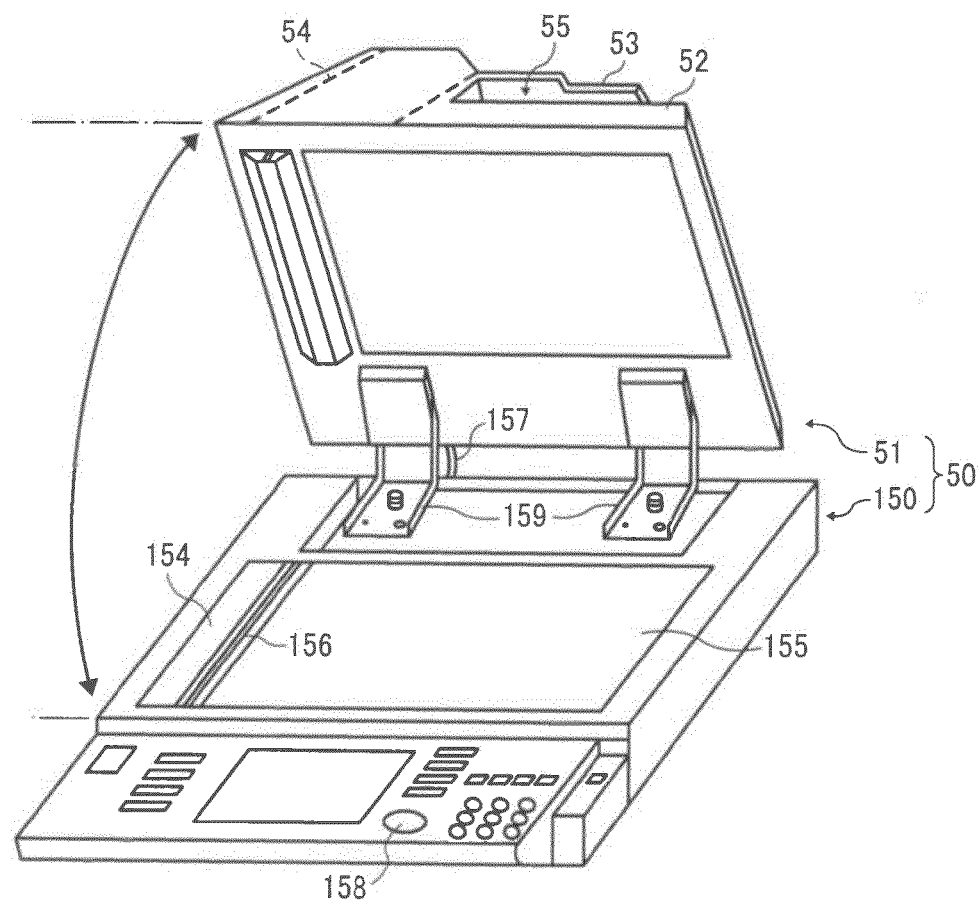
FIG. 30 is an oblique view showing a scanner and an ADF of the copier in FIGS. 27 to 29.

The ADF 51 provided on the scanner 150 is mounted in a platen cover 52 and includes an original platen 53 on which the original MS before reading is placed, a conveyance unit 54 to convey the original MS as a sheet, and an original stack table 55 to stack the original MS after reading. As illustrated in FIG. 30, the ADF 51 is movable in the vertical direction via a hinge 159 fixed to the scanner 150. Then, according to the oscillating movement, the platen cover 52 may be open and close as an open/close door. When open, the first contact glass 154 and the second contact glass 155 on an upper surface of the scanner 150 are exposed. One-side bound original such as a book with one edge of the original bundle stapled can not be separated page by page, and therefore, cannot be sent by using an ADF. Then, in a case of the one-side bound original, after the ADF 51 is opened as illustrated in FIG. 30, the surface of the page to be read is placed with the printing side face down on the second contact glass 155, and the ADF is closed. Then, the image in the page is to be read by the moving reading section 152 of the scanner 150 as illustrated in FIG. 27.

On the other hand, in a case of the original bundle including a plurality of originals MS each separated from each other, the originals MS are automatically conveyed one by one by the ADF 51 and can be sequentially read by the first surface fixed reading part 151 and the second surface fixed reading part 152 inside the ADF 51. In this case, after the original bundle is placed on the original platen 53, a copy start button, not shown, needs to be pushed. Then, the ADF 51 sends the original MS of the original bundle placed on the platen 53 one by one from a top sheet to the conveyance unit 54, and conveys the sheet while reversing it, to the original stack table 55. During this process, just after reversing the original MS, the ADF 51 passes the sheet to the position just above the first surface fixed reading section 151 of the scanner 150. In this time, the first surface image of the original MS is read by the first surface fixed reading section 151.

Figure 31:
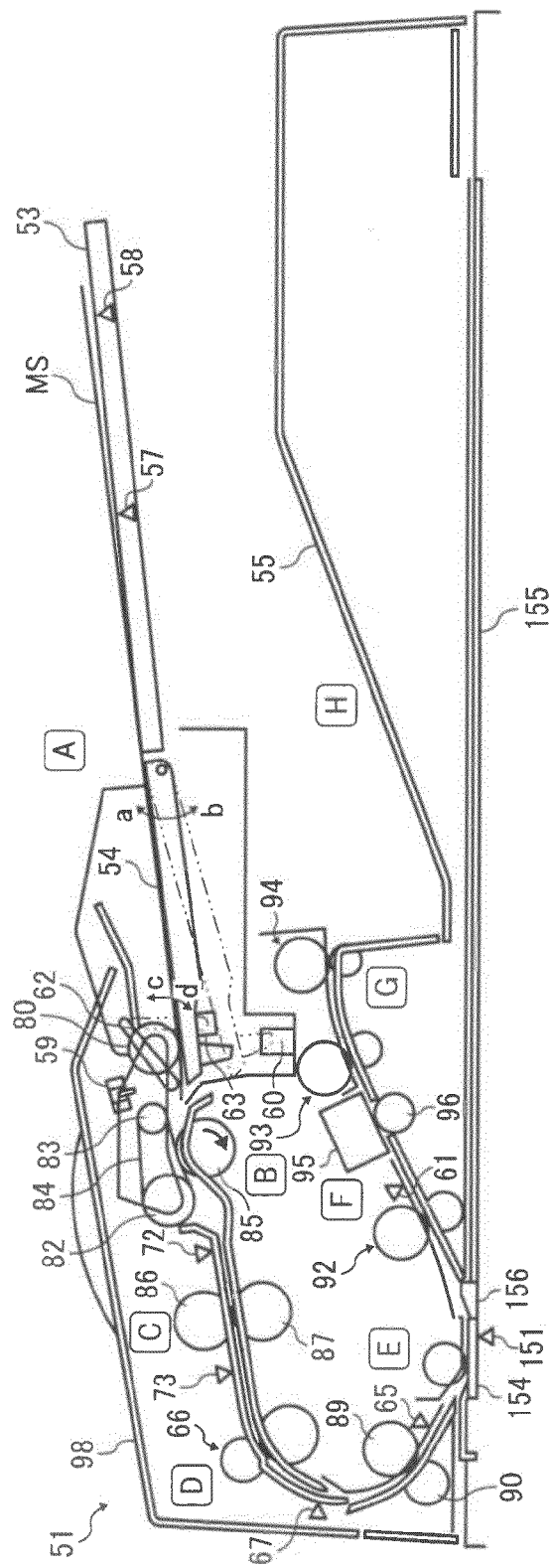
FIG. 31 is an enlarged view of a main part of the ADF and an upper part of the scanner.

FIG. 31 is an enlarged view showing a structure of the main part of the ADF 51 together with an upper portion of the scanner 150. The ADF 51 includes an original set part A, a sheet separation and conveyance part B, a registration part C, a turning part D, a first reading and conveyance part E, a second reading and conveyance part F, a sheet discharging part G and a stack part H.

The original set part A includes the original platen 53 on which a bundle of the original MS is set. The sheet separation and conveyance part B separates the original MS one by one from the set bundle of the original MS and conveys it. The registration part C is used to temporarily abut the conveyed original MS and send it after aligning the sheet. In addition, the turning part D has a bent conveying section bending in a C-letter shape, and bends the original MS with this bent conveying section and reverses the sheet upside down. The first reading and conveyance part E, while conveying the original MS on the first contact glass 154, causes the first fixed reading part 151 provided inside the scanner, not shown, below the first contact glass 154 to read the first surface of the original MS. In addition, the second reading and conveyance part F, while conveying the original MS under the second fixed reading part 95, causes the second fixed reading part 95 to read the second surface of the original MS. In addition, the sheet discharging part G discharges the original MS of which image on the surface has been read out, to the stack part H. The stack part H stacks the original MS on the stack table 55.

The leading edge of the original MS is placed on a original table 54 movable in a direction indicated by an arrow "ab" depending on the thickness of the bundle of the original MS, and the trailing edge of the original MS is set on the original platen 53. In this case, both edges in the widthwise direction (direction perpendicular to the sheet surface) are each guided by side guides, not shown, to be position-adjusted in the widthwise direction. The thus set original MS pushes up a lever member 62 movably provided above the movable original table 54. Then, an original set sensor 63 detects that the original MS is set and transmits a detection signal to a controller, not shown. This detection signal is sent to a reading controller of the scanner via an interface (I/F) from the controller.

The original platen 53 includes a first length sensor 57 and a second length sensor 58 formed of a reflection-type photo-sensor or an actuator-type sensor to detect a length of the original MS in the conveyance direction. According to these length sensors, the length of the original MS in the conveyance direction can be detected.

A pickup roller 80 which is supported by a cam unit to be movable in the vertical direction (indicated by an arrow "cd") is provided above the bundle of the original MS placed on the movable original table 54. This cam unit allows the pickup roller 80 to be moved vertically by being driven by a pickup motor, not shown. When the pickup roller 80 moves upward, the movable original table 54 oscillates in the arrow "a" direction in the figure accompanied by the movement of the pickup roller 80, and the pickup roller 80 contacts the uppermost original sheet MS in the bundle of the original MS. When the movable original table 54 further goes up, a table rise detection sensor 59 detects that the movable original table 54 has risen to the upper limit. Accordingly, the pickup motor stops, and the rise of the movable original table 54 stops.

The operation panel section including numeric keys, a display and the like is provided to the main body of the copier. A user can perform key operation to set a reading mode among a duplex reading mode, a one-side reading mode, and others, and pushing operation to push a button such as a copy start key in the operation panel section. When the copy start key is pushed, an original conveying signal is transmitted from the main body controller to the controller of the ADF 51. Then, the pickup roller 80 is driven to rotate by the normal rotation of a sheet feed motor 76, thereby sending the original MS on the movable original table 54 therefrom.

It is possible to set the duplex or one-side reading mode en bloc for all originals MS placed on the movable original table 54. In addition, it is also possible to set the duplex or one-side reading mode for each original MS individually. For example, the duplex reading mode can be set to the $1^{st}$ and $10^{th}$ originals MS and the one-side reading mode can be set to the other originals MS.

The original MS sent out by the pickup roller 80 enters the sheet separation and conveyance part B and is fed in a position contacting a sheet feed belt 84. This sheet feed belt 84 is stretched over a driving roller 82 and a driven roller 83, and is driven by the driving roller 82 to rotate endlessly in the clockwise direction in the figure, accompanied by the normal rotation of the sheet feed motor 76. A reverse roller 85 is so provided as to contact the lower stretched surface of the sheet feed belt 84. The reverse roller 85 is driven to rotate in the clockwise direction according to the normal rotation of the sheet feed motor 76. In the contact section, the surface of the sheet feed belt 84 moves in the sheet feed direction. By contrast, the reverse roller 85 is brought into contact with the sheet feed belt 84 with a predetermined pressure. When the reverse roller 85 directly contacts the sheet feed belt 84, or only one original MS is sandwiched in the contact nip portion, the reverse roller 85 rotates accompanied by the belt or the original MS. However, when a plurality of originals MS are sandwiched in the contact nip portion, the accompanying force becomes less than the torque of a torque limiter, whereby the reverse roller 85 is driven to rotate in the clockwise direction which is a reverse direction to the accompanied direction. By this, the originals MS lower than the topmost sheet are applied, by the reverse roller 85, with a moving force opposite to the sheet feed direction, and the topmost original MS only is separated from the plurality of originals MS.

The original MS separated to be one sheet only by the function of the sheet feed belt 84 and the reverse roller 85 enters into the registration part C. When passing a portion direct below a contact sensor 72, a leading edge of the original MS is detected. At this time, the pickup roller 80 receiving a driving force of the pickup motor is still rotating, but is separated from the original MS by the descent of the movable original table 54. Therefore, the original MS is conveyed only by the endless movement of the sheet feed belt 84. Then, the endless movement of the sheet feed belt 84 continues for a predetermined period of time from a timing that the leading edge of the original MS is detected by the contact sensor 72, and the original MS abuts a contact nip portion between a pullout driving roller 86 and a pullout driven roller 87 driven to rotate while contacting the roller 86.

The pullout driven roller 87 serves to convey the original MS to an intermediate roller pair 66 downstream of the original conveying direction, and is driven to rotate by the reverse rotation of the sheet feed motor 76. When the sheet feed motor 76 reversely rotates, the pullout driven roller 87 and one roller of the intermediate roller pair 66 contacting each other start to rotate, and the endless movement of the sheet feed belt 84 stops. Further, the rotation of the pickup roller 80 stops.

The original MS sent out from the pullout driving roller 87 passes through a portion directly below an original width sensor 73. The original width sensor 73 includes a plurality of sheet detection parts formed of reflection type photosensor and the like. These sheet detection parts are arranged in the original width direction (and in a direction perpendicular to the sheet surface). Based on which sheet detection part detects the original MS, the widthwise size of the original MS is detected. In addition, the length of the original MS in the conveying direction is detected based on the timing from when the leading edge of the original MS is detected by the contact sensor 72 until the trailing edge of the original MS is not detected by the contact sensor 72.

The leading edge of the original MS, of which widthwise size is detected by the contact sensor 72, enters the turning part D and is sandwiched by a contact nip portion between rollers of the intermediate roller pair 66. The conveyance speed of the original MS by this intermediate roller pair 66 is set to be higher than that in the first reading and conveyance part E, which will be described later. By this, the time to send the original MS to the first reading and conveyance part E is reduced.

The leading edge of the original MS to be conveyed in the turning part D passes a position opposite a reading entrance sensor 67. Accordingly, the leading edge of the original MS is detected by the reading entrance sensor 67. Then, during when the leading edge of the original MS is conveyed to a position between a reading entrance roller pair 89 and 90, the intermediate roller pair 66 decreases the original conveying speed. In addition, one roller in the reading entrance roller pair 89 and 90, one roller in a reading outlet roller pair 92, and one roller in a second reading outlet roller pair 93 start rotation, respectively, in accordance with the start of the rotational driving of a reading motor 77.

In the turning part D, the original MS is reversed upside down while being conveyed in the bent conveyance path between the intermediate roller pair 66 and the reading entrance roller pair 89 and 90, and the conveyance direction is folded back. Then, the leading edge of the original MS which has passed through the nip between the reading entrance roller pair 89 and 90, passes a portion directly below a registration sensor 65. At this moment, if the leading edge of the original MS is detected by the registration sensor 65, the original conveying speed is gradually reduced in the predetermined conveyance distance, and the conveyance of the original MS temporarily stops in front of the first reading and conveyance part E. In addition, a registration stop signal is transmitted to the reading controller, not shown.

When the reading controller that has received the registration stop signal transmits a reading start signal, the controller of the ADF 51 controls to restart rotation of the reading motor 77 to increase the conveyance speed of the original MS up to a predetermined conveyance speed until the leading edge of the original MS reaches the first reading and conveyance part E. Then, at a timing when the leading edge of the original MS calculated based on the pulse count from the reading motor 77 reaches a reading position by the first fixed reading part 151, the controller transmits a gate signal representing an effective image area of the first surface of the original MS in the sub-scan direction to the reading controller. This transmission is performed until the trailing edge of the original MA passes through the reading position by the first fixed reading part 151, and the first surface of the original MS is read by the first fixed reading part 151.

The original MS which has passed through the first reading and conveyance part E further passes through the reading outlet roller pair 92, which will be described later, and thereafter, the leading edge of the original MS is detected by a sheet discharge sensor 61. If the one-side reading mode is set, reading of the second surface of the original MS by the second fixed reading part 95 is not performed. Then, if the leading edge of the original MS is detected by the sheet discharge sensor 61, the normal driving of the sheet discharge motor 78 is started and one sheet discharge roller provided below among the sheet discharge roller pair 94 is driven to rotate in the clockwise direction. In addition, based on the sheet discharge motor pulse count after the sheet discharge sensor 61 detects the leading edge of the original MS, the timing when the trailing edge of the original MS passes through the nip between the sheet discharge roller pair 94 is calculated. Then, based on the calculation results, at a timing immediately before the trailing edge of the original MS passes through the nip between the sheet discharge roller pair 94, the driving speed of the sheet discharge motor 78 is slowed, so that the original MS is discharged at a speed not jumping from the stack table 55.

On the other hand, when the duplex reading mode is set, after the sheet discharge sensor 61 detects the leading edge of the original MS, the timing in which the leading edge of the original MS reaches the second fixed reading part 95 is calculated based on the pulse count of the reading motor 77. At that timing, the controller transmits a gate signal representing an effective image area of the second surface of the original MS in the sub-scan direction to the reading controller. This transmission continues until the trailing edge of the original MS passes through the reading position to be read by the second fixed reading part 95, whereby the second surface of the original MS is read by the second fixed reading part 95.

The second fixed reading part 95 as a reading means is formed of a contact image sensor (CIS), and has a reading surface applied with a coating process in order to prevent longitudinal stripes due to adhesion of sticky foreign substances attached to the original MS. A second reading roller 96 is provided opposite the second fixed reading part 95 and supports the original MS from a non-reading side, as an original supporting means. The second reading roller 96 prevents the original MS from floating at the reading position by the second fixed reading part 95, and serves as a reference white section so that the second fixed reading part 95 obtains shading data.

As illustrated in FIG. 27, the recording sheet sent out from the sheet feed cassette 42 is sandwiched by the nip between the separation roller pair 45.

Figure 32:
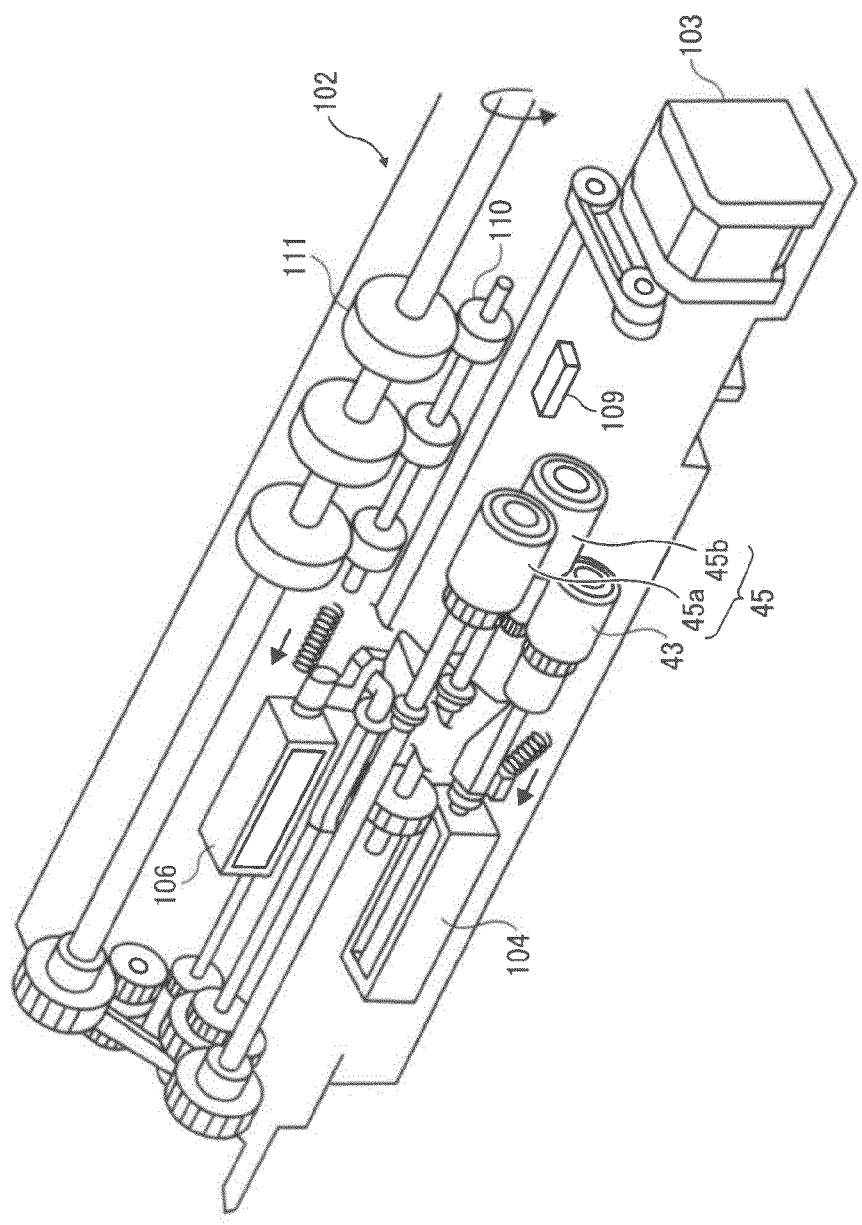
FIG. 32 is an exploded perspective view of a delivery roller in a sheet supply unit and its proximity portion seen from one side in the roller axial direction.
Figure 33:
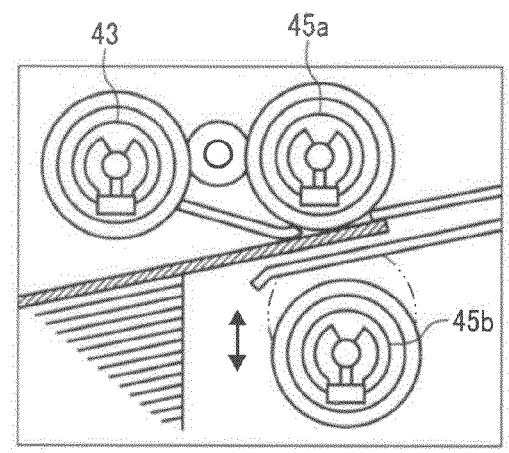
FIG. 33 is an enlarged view of a peripheral portion of the delivery roller.
Figure 34:
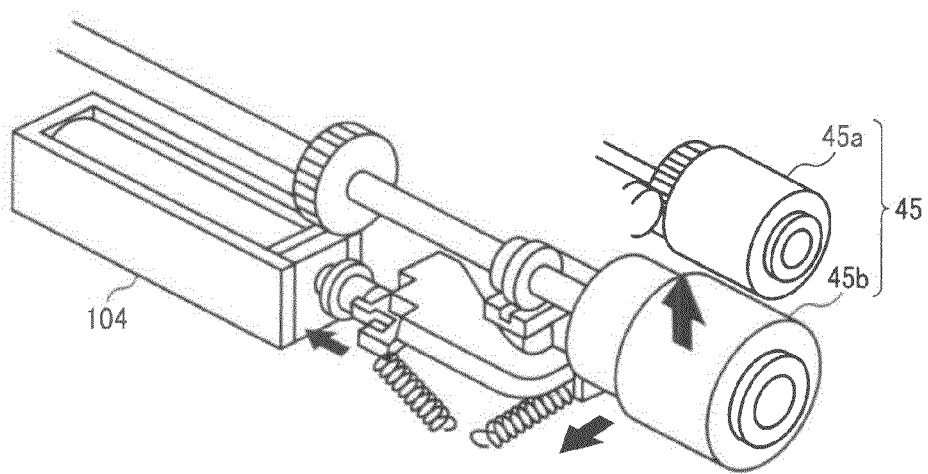
FIG. 34 is an enlarged oblique view of a peripheral portion of a sheet feed separation roller pair.

FIG. 32 is an exploded oblique view showing a structure around the delivery roller 43 in the sheet supply unit 40 seen from one edge in the roller axis direction. FIG. 33 is an enlarged oblique view showing a structure around the delivery roller 43. FIG. 34 is an enlarged oblique view showing a structure around the separation roller pair 45a and 45b.

Operation related to the recording sheet in a case in which the separation roller pair 45a and 45b is not degraded will now be described. Specifically, when the recording sheet is delivered from the sheet feed cassette 42, not shown, a pickup solenoid 104 is first driven to press the delivery roller 43 against the recording sheet inside the sheet feed cassette and a pressure solenoid 106 is driven to press the separation roller 45b against the sheet feed roller 45a. Then, in this state, the sheet feed motor 103 is driven in reverse. The delivery roller 43 is driven to rotate in the counterclockwise direction in the figure, so that the recording sheet is sent toward the nip formed by contact between the sheet fed roller 45a and the separation roller 45b. In this case, the sheet feed roller 45a is driven to rotate in the counterclockwise direction so that the recording sheet sandwiched in the nip is sent to a sheet path, not shown. In this state, if the separation roller 45b directly contacts the sheet feed roller 45a or contacts it via only one recording sheet P as explained with reference to FIG. 35, more torque to follow the sheet feed roller 45a or the recording sheet is applied to the separation roller 45b. Then, a torque limiter, not shown, configured to link the driving force from the sheet feed motor 103 to the separation roller 45b runs idle. Accordingly, the separation roller 45b rotates in a clockwise direction, that is, a normal direction, following the sheet feed roller 45a and the recording sheet P.

In such a configuration, when there is no recording sheet to be created, if the sheet feed roller 45a and the separation roller 45b are retracted and are not in contact each other, operations such as attachment/detachment of the rollers may be improved. Further, by bringing both rollers into contact only when the recording sheet is being printed, the burden on both rollers may be decreased, thereby prolonging the service lives of these parts. In addition, when a paper jam occurs before or after the sheet feed and separation nip, if both rollers are retracted, removal of the jammed sheet may also be facilitated.

Figure 36:
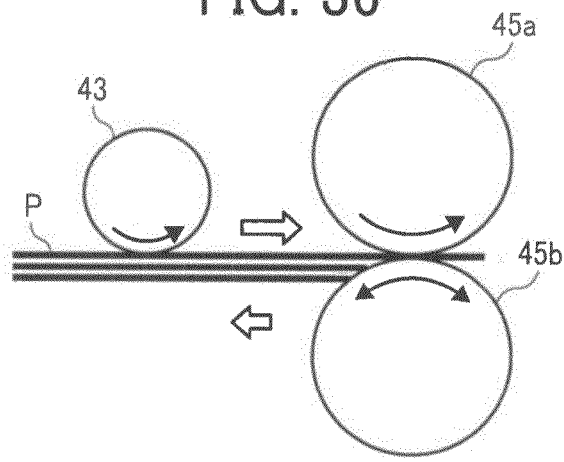
FIG. 36 is a schematic view illustrating a rotation state of each roller when a plurality of overlapping recording sheets are sent to the sheet feed separation roller pair formed by contact between a not-degraded sheet feed roller and a not-degraded separation roller.

As illustrated in FIG. 36, if two or more recording sheets P are sandwiched in the nip together, the torque limiter, not shown, does not run idle and the reverse driving force of the sheet feed motor 103 is linked to the separation roller 45b. Then, as illustrated, the separation roller 45b rotates in the reverse, counterclockwise direction and the recording sheets excluding and below the uppermost recording sheet P are returned, by the separation roller 45b, to the sheet feed cassette.

Figure 37:
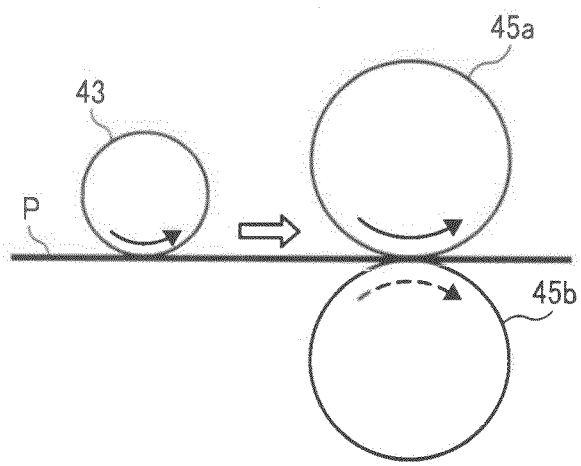
FIG. 37 is a schematic view illustrating a rotation state of each roller when a recording sheet is sent in the sheet feed separation roller pair formed by contact between a degraded sheet feed roller and a not-degraded separation roller.

On the other hand, suppose that the surface of the sheet feed roller 45a is degraded to have a lowered friction resistance. Then, as illustrated in FIG. 37, when a recording sheet P is sandwiched by a nip, there occurs a slip between the sheet feed roller 45a and the recording sheet P. Accordingly, the rotation amount of the separation roller 45b in the direction following the recording sheet P, that is, a clockwise direction, is decreased.

Figure 38:
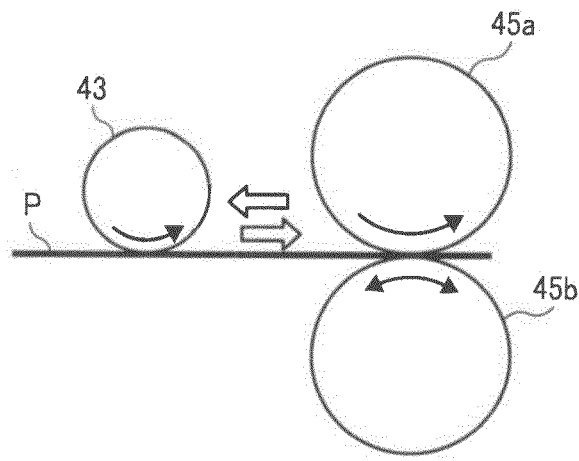
FIG. 38 is a schematic view illustrating a rotation state of each roller when a plurality of overlapping recording sheets are sent to the sheet feed separation roller pair formed by a contact between a not-degraded sheet feed roller and a degraded separation roller.

Now suppose that the surface of the separation roller 45b is degraded to have a lowered friction resistance. Then, as illustrated in FIG. 38, the torque to cause the separation roller 45b to rotate in the direction following the recording sheet P is not transmitted favorably, and the separation roller 45b sometimes rotates in the reverse direction. In this case also, the rotation amount of the separation roller 45b in the direction following the recording sheet P is decreased.

Figure 39:
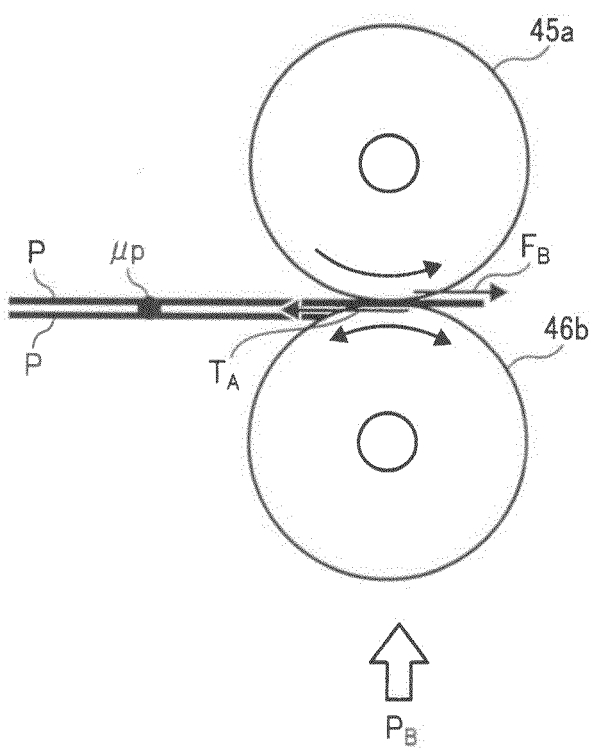
FIG. 39 is a schematic view illustrating various stresses generated at the periphery of the sheet feed separation nip.

FIG. 39 is a schematic view illustrating various forces occurring around the sheet feed and separation nip. $F_B$ represents a sheet conveyance force in the sheet feed direction applied from the sheet feed roller 45a toward the uppermost recording sheet P entering into the nip. $P_B$ represents a pressing force to press the separation roller 46b toward the sheet feed roller 46a. $T_A$ represents a separation force which is a force in a direction reverse to the sheet feed direction, applied from the separation roller 46b toward the lowermost recording sheet P entering into the nip. In addition, $\mu_p$ represents a friction coefficient between sheets, which is a surface friction coefficient between the recording sheets. The sheet feed roller friction coefficient, being a surface friction coefficient of the sheet feed roller 46a with respect to a sheet, is represented as $\mu_r$.

An optimum separation condition ignoring the sheet weight based on the sheet feed condition in the uppermost recording sheet and the separation condition in the lowermost recording sheet can be represented by the following formula.

$$\frac{1}{\mu_p} T_A > P_B > \frac{1}{\mu_r} T_A \qquad \text{[Formula 13]}$$

Figure 40:
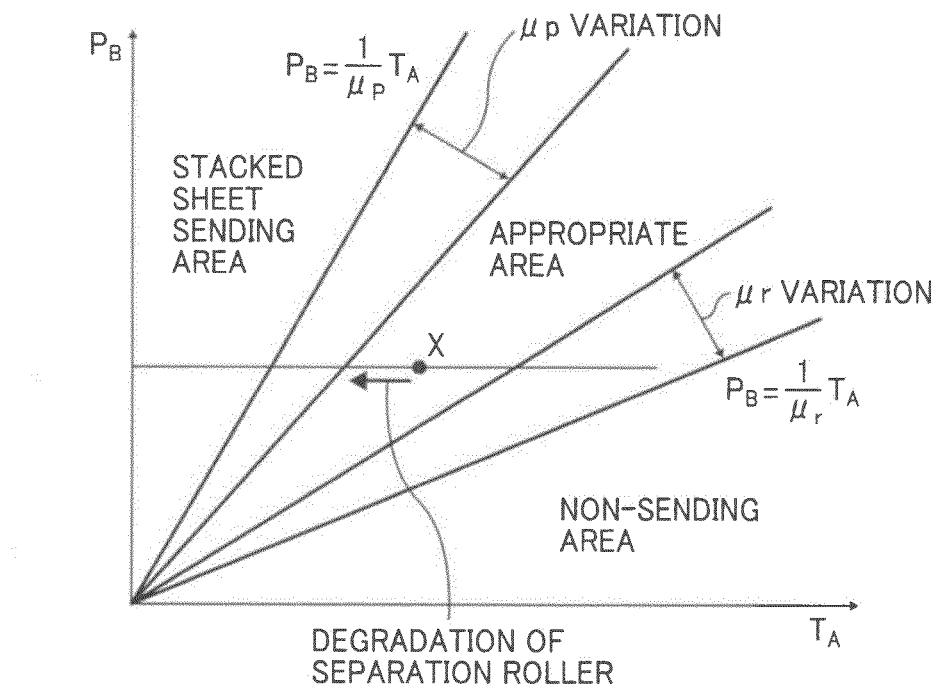
FIG. 40 is a graph showing a relation between a pressing force $P_B$ and a separation force $T_A$.

FIG. 40 is a graph obtained by graphing the above formula 13. Herein, the sheet feed roller 46a is considered, and the friction coefficient $\mu_r$ between the sheet feed roller and the sheet changes proportionally to the degradation in the surface of the sheet feed roller 46a. As the sheet feed roller friction coefficient $\mu_r$ decreases, the slant of the line in the variation area of the sheet feed roller friction coefficient $\mu_r$ decreases. Accordingly, non-sending of the sheet easily occurs. The variation of the friction coefficient between sheets $\mu_p$ represents an allowance of the error factors included in the design. The friction coefficient between sheets $\mu_p$ and the friction coefficient between the sheet and the sheet feed roller $\mu_r$ are uncontrollable factors, and therefore, the setting condition X should be determined by securing a certain allowance in the design stage.

Next, the present copier will now be described.

Figure 41:
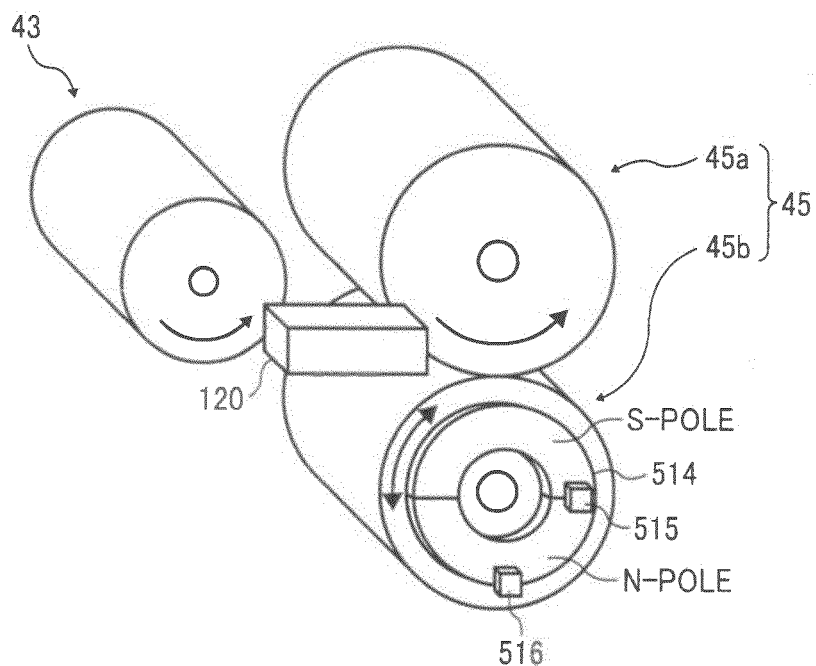
FIG. 41 is an enlarged schematic view showing a peripheral portion of the sheet feed separation roller pair.

FIG. 41 is an enlarged schematic view showing a structure around the sheet feed and separation roller pair 45. In the vicinity of the delivery roller 43, arranged is a speed sensor 120 to detect a moving speed in the sheet feeding direction of an uppermost recording sheet at the sheet feed roller 45a side. Among the recording sheets delivered from the delivery roller 43, the moving speed in the sheet feed direction of the uppermost recording sheet is detected by this speed sensor 120 and the detection result is sent to the controller.

The speed sensor 120 may be an optical displacement sensor widely used in an optical mouse input device for a personal computer, and is configured to take a picture of the surface of a target object using a plurality of imaging devices arranged in a matrix. Then, each imaging device takes a picture periodically and repeatedly and captures movement of the characteristic image (for example, characteristic concavity and convexity) in the two dimensional plane of a recording sheet that is a detection target. Accordingly, displacement and the displacement speed of the recording sheet in the 2-dimensional plane can be detected. If the matrix of the imaging devices is slanted by 45° with respect to the sheet feeding direction and the speed sensor 120 is provided, the resolution in each of the displacement amounts in the sheet feed direction and in the direction perpendicular to the sheet feed direction (roller axis direction) is improved and detection with higher resolution can be enabled. Then, skewing of the recording sheet can be detected with higher precision.

A doughnut-shaped magnet 514 as a detection target is fixed to an end surface of the roller portion of the separation roller 45b. A first Hall sensor 515 and a second Hall sensor 516 are provided opposite this magnet 514 in the roller axis direction. The first Hall sensor 515 and the second Hall sensor 516 are fixed at positions shifted by 90° from each other with the rotation axis of the separation roller 45b set as a center. Accordingly, each device detects changes in the magnetic flux density according to the rotation with a phase difference of 90°. The magnet 514, the first Hall sensor 515, and the second Hall sensor 516 each form a part of the rotation measuring mechanism according to the third modified example.

Figure 42:
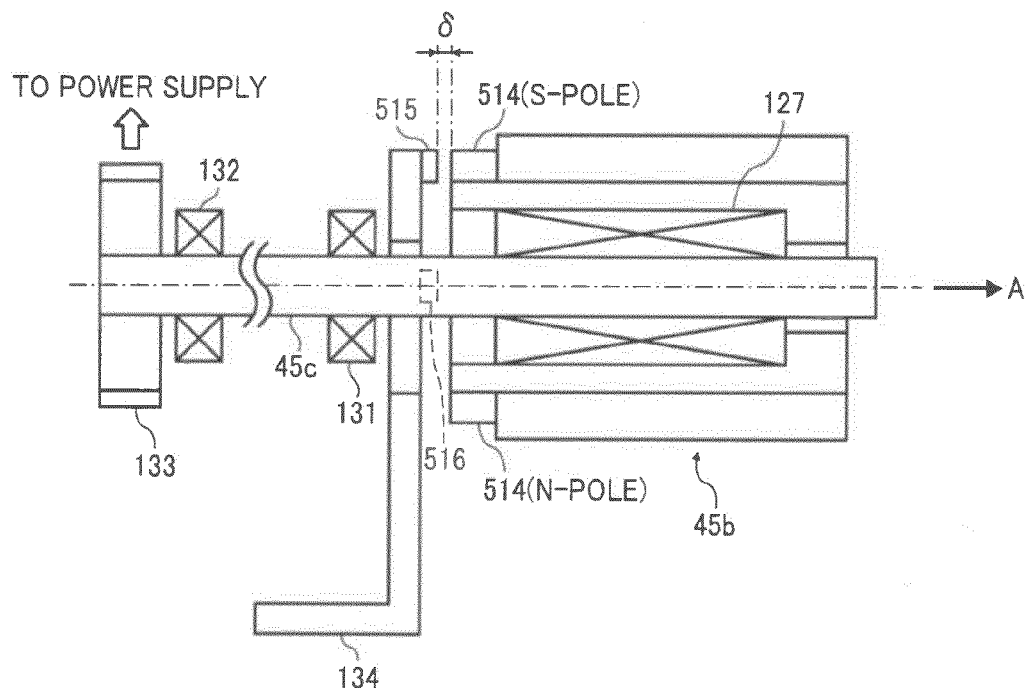
FIG. 42 is a vertical cross-sectional view showing the separation roller together with its peripheral structure.
Figure 43:
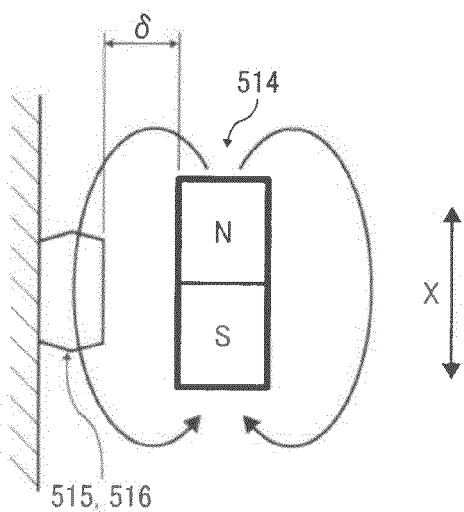
FIG. 43 is an enlarged schematic view showing a Hall sensor and a magnet fixed to the separation roller.

FIG. 42 is a vertical cross-sectional view showing the separation roller 45b together with its peripheral structure. The first Hall sensor 515 and the second Hall sensor 516 provided at positions shifted by 90° from each other with the rotation axis of the separation roller 45b set as a center are fixed to a bracket 134 supported to the copier main body. Then, the sensors 515 and 516 are provided opposite the magnet 514 fixed to the edge surface of the separation roller 45b via a gap δ. The rotation axis member 45c of the separation roller 45b can be pulled out in the direction indicated by an arrow A to be removed from the copier main body. By providing the two Hall sensor elements adjacently at a side opposite to the arrow A direction with respect to the separation roller 45b, the arrow A direction side is made to be a vacant space, thereby making it easier to pull out the separation roller 45b. In addition, because it is possible to make the gap dependence of the output from two Hall sensors 515 and 516, even though there is a variation in the gap δ due to manufacturing error, there is no adverse affect on the detection of the rotation angular change of the separation roller 45b. Accordingly, the rotation angular change can be detected with higher precision. In addition, by fixing the magnet 514, which is comparatively heavy, to the separation roller 45b, the resistance to the reaction force in the direction opposite to the pressing direction is strengthened. Further, as illustrated in FIG. 43, because the magnet 514 and the Hall sensors are not contacted, the rotation angular change of the separation roller 45b can be detected without giving any load to the separation roller 45b.

As illustrated in FIG. 42, the torque limiter 127 is provided inside the separation roller 45b and between the rotation axis member 45c and the inner surface of the rotation roller 45b. Outside the separation roller 45b, the rotation axis member 45c is rotatably supported by two roller bearings 131 and 132 separated by a certain distance from each other in the axis direction. At an end opposite the arrow A direction, a driving gear 133 to receive a rotational driving force is fixed to the rotation axis member 45c.

Figure 44:
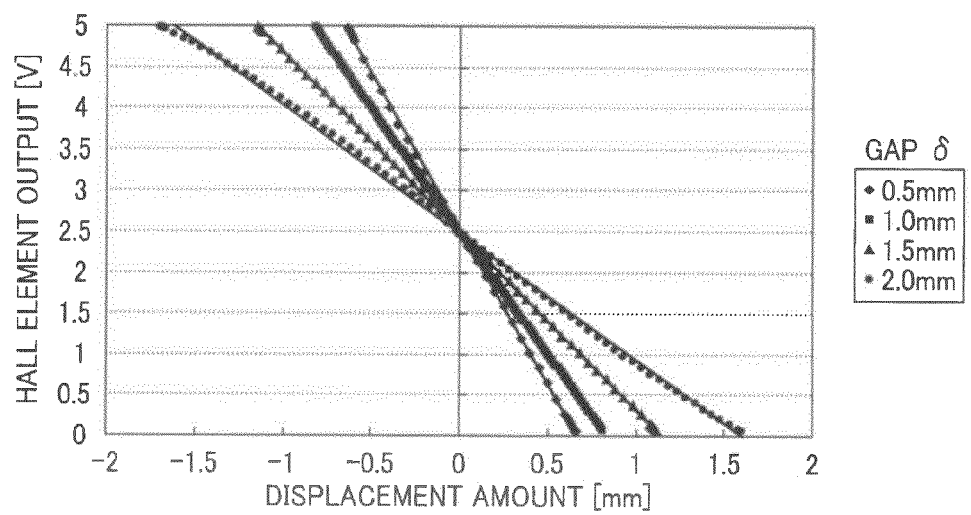
FIG. 44 is a graph showing output characteristics of the Hall sensor element.

FIG. 44 is a graph showing output characteristics of the Hall sensors 515 and 516. This graph shows output characteristics of a linear Hall IC incorporating an amplifier EQ-711L manufactured by Asahi Kasei Electronics. As illustrated in FIG. 43, when the magnet opposite the Hall sensor with a predetermined gap δ is moved, the output corresponding to the magnetic flux density at the opposite position can be obtained. The output characteristics change depending on the gap δ, as illustrated in FIG. 44. If the gap δ is made to be equal for each of the two sensors, it is possible to prevent degradation in the detection precision due to product-by-product variation of the gap δ.

Figure 35:
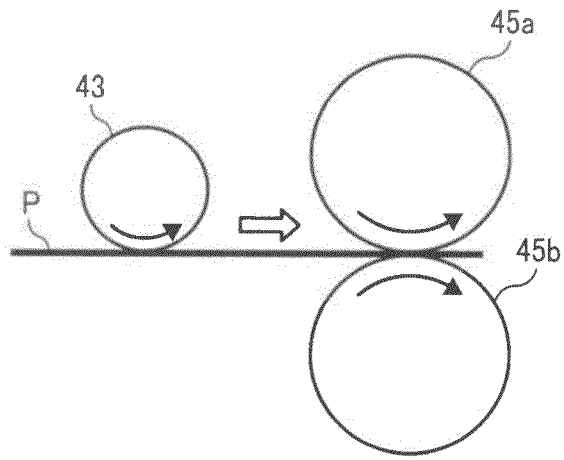
FIG. 35 is a schematic view illustrating a rotation state of each roller when a recording sheet is sent to the sheet feed separation roller pair formed by contact between a not-degraded sheet feed roller and a not-degraded separation roller.
Figure 45:
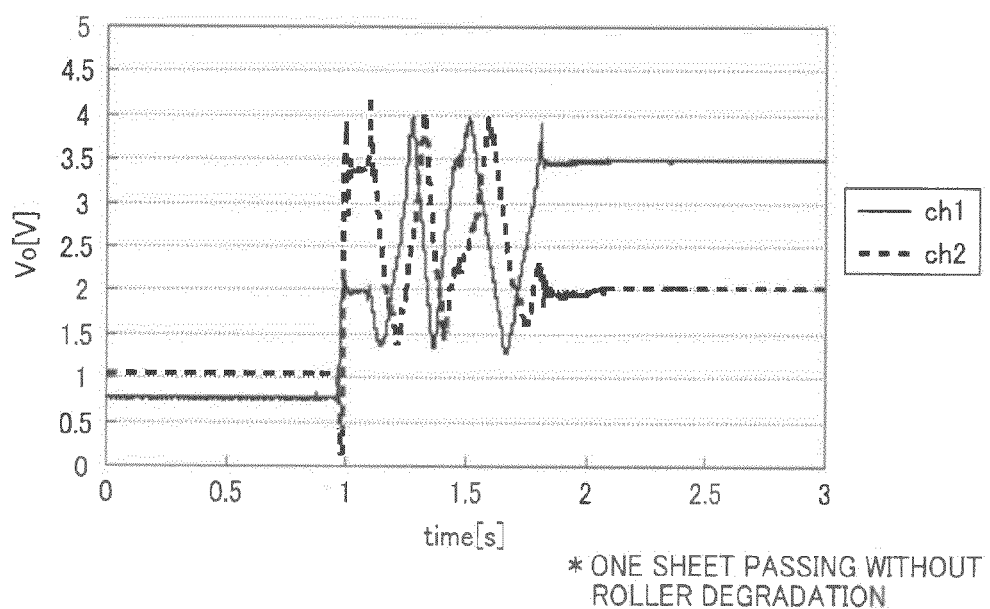
FIG. 45 is a graph showing changes in the output from the Hall sensor element in a state as illustrated in FIG. 35.

FIG. 45 is a graph showing changes in the output from the Hall sensors in a state as illustrated in FIG. 35. The output ch1 shows an output from the first Hall sensor 515 and the output ch2 shows an output from the second Hall sensor 516. Regarding the output when the magnet 514 fixed to the separation roller 45b constantly rotates, there is a relation that one output is a sine wave and the other a cosine wave.

In FIG. 45, the reason why the graph shows a leveling off from substantially 0 to 1 second and from 2.1 to 3 seconds is that the separation roller 45*b* is not driven during those periods. At a time of substantially 1 second, the separation roller 45*b* is brought into contact with the sheet feed roller 45*a*, and thereafter, the separation roller 45*b* is driven at a time of 1.1 seconds. In addition, at about 1.8 seconds, the separation roller 45*b* is separated from the sheet feed roller 45*a*, and driving of the separation roller 45*b* is stopped at substantially 2.1 seconds.

Figure 46:
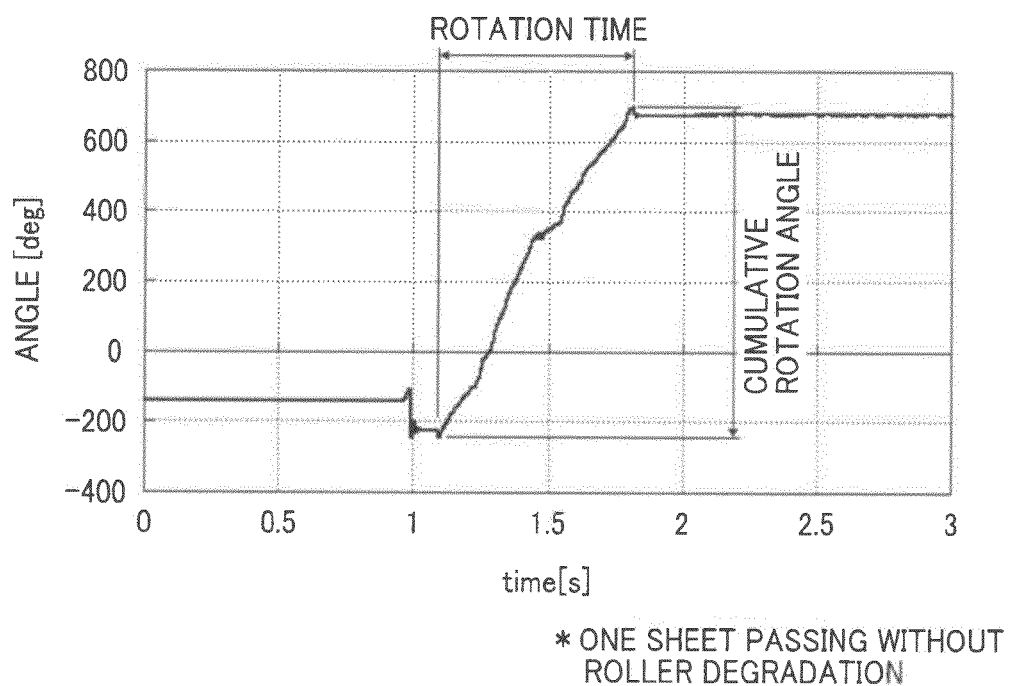
FIG. 46 is a graph in which a graph in FIG. 45 is graphed to the cumulative rotation angle of the separation roller in one sheet passing operation.

FIG. 46 shows a graph in which the graph in FIG. 45 is transformed into a cumulative rotation angle (or cumulative rotation amount) of the separation roller 45*b*. The graph shows how much the cumulative rotation angle becomes with respect to the rotation time identified based on the driving signal applied to the separation roller 45*b*. In a case in which there is no surface degradation to either of the sheet feed roller 45*a* and the separation roller 45*b* and only one recording sheet is singly sent to the sheet feed and separation nip, as illustrated in FIG. 46, a waveform in which the cumulative rotation angle of the separation roller 45*b* monotonously increases toward the plus side (in a following direction side) can be obtained.

Figure 47:
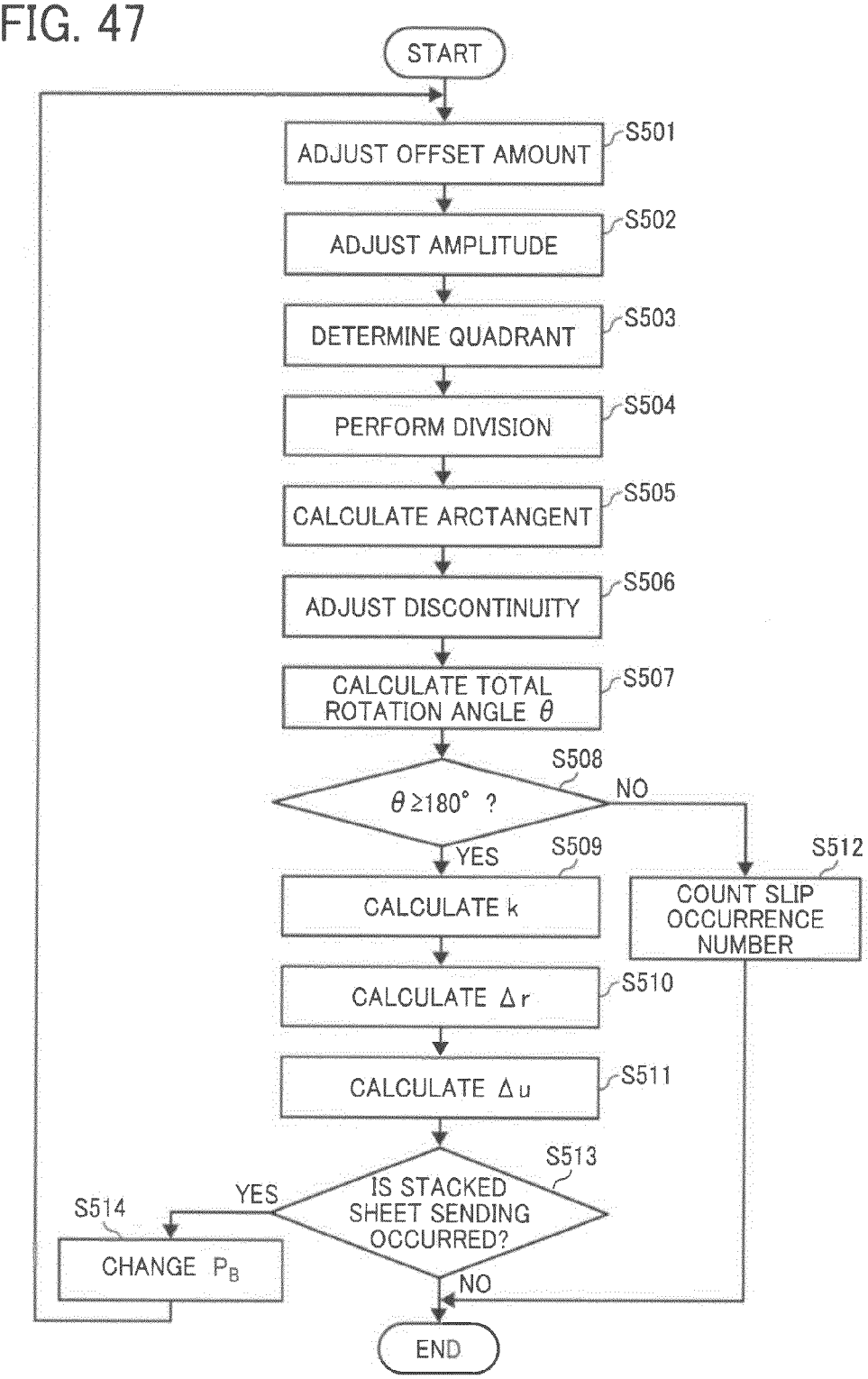
FIG. 47 is a flowchart showing a cumulative rotation angle calculation process to be performed by a calculation unit of the rotation measuring mechanism incorporated in the copier.

FIG. 47 is a flowchart showing a cumulative rotation angle calculation process performed by the calculation unit of the rotation measuring mechanism mounted in the present copier. In this cumulative rotation angle calculation process, an offset of about 2.5 volts is generated in the outputs from the first Hall sensor and the second Hall sensor. Then, the arctangent cannot be obtained by the division by using the outputs as they are. To remove the offset, an offset adjustment is performed (S501). Thereafter, the operations from S502 to S512 are the same as those shown in FIG. 11, and the description thereof will be omitted.

When measuring the displacement amount "u" and a difference "Δu" between the displacement amount "u" and the reference value in chronological order, the Δu becomes a multiple value by the number of multiple overlapping sheets at a time when the multiple overlapping sheet conveyance occurs, thereby determining the occurrence of the overlapping sheets (S513). Then, according to the conditional expression as represented in the formula 13, an operation to increase by a predetermined amount the pressing force $P_B$ is performed (S514). If the detection of overlapping sheets is performed again, the overlapping sheet feed may be prevented within a range of the rotation amount of the normal separation roller.

Figure 48:
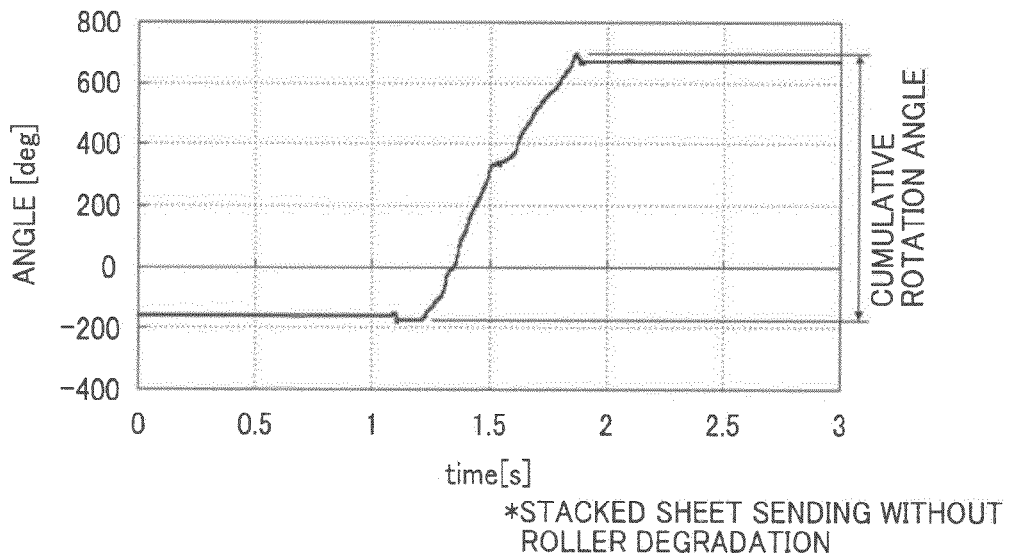
FIG. 48 is a graph showing changes in the cumulative rotation angle of the separation roller when, in a state in which the sheet feed roller and the separation roller each have no degradation, a plurality of overlapping recording sheets are sent to the sheet feed separation nip.

FIG. 48 is a graph showing changes in the cumulative rotation angle of the separation roller 45*b* when, in a state in which the sheet feed roller and the separation roller each have no degradation, a plurality of overlapping recording sheets are sent to the sheet feed and separation nip. As illustrated in FIG. 48, even when the sheet feed roller and the separation roller each have no degradation, and a plurality of recording sheets are sent overlapped to the sheet feed and separation nip, the cumulative rotation angle of the separation roller 45*b* increases substantially monotonously in the plus side.

Figure 49:
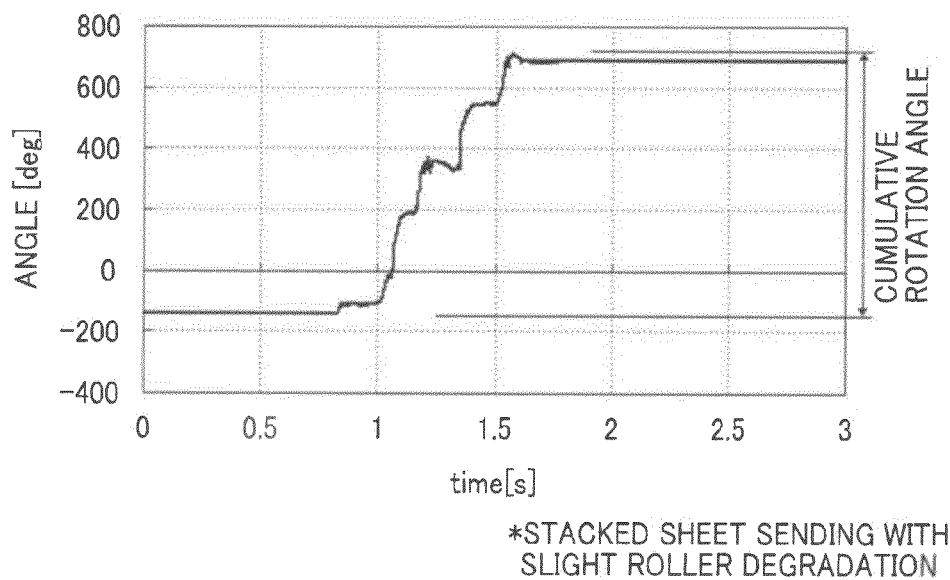
FIG. 49 is a graph showing changes in the cumulative rotation angle of the separation roller when, in a state in which the separation roller surface is slightly degraded, a plurality of overlapping recording sheets are sent to the sheet feed separation nip.

FIG. 49 is a graph showing changes in the cumulative rotation angle of the separation roller when, in a state in which the separation roller surface is slightly degraded with no degradation in the sheet feed roller, a plurality of overlapping recording sheets are sent to the sheet feed separation nip. As illustrated in FIG. 49, in this case, the cumulative rotation angle of the separation roller 45*b* decreases compared to FIG. 48.

Figure 50:
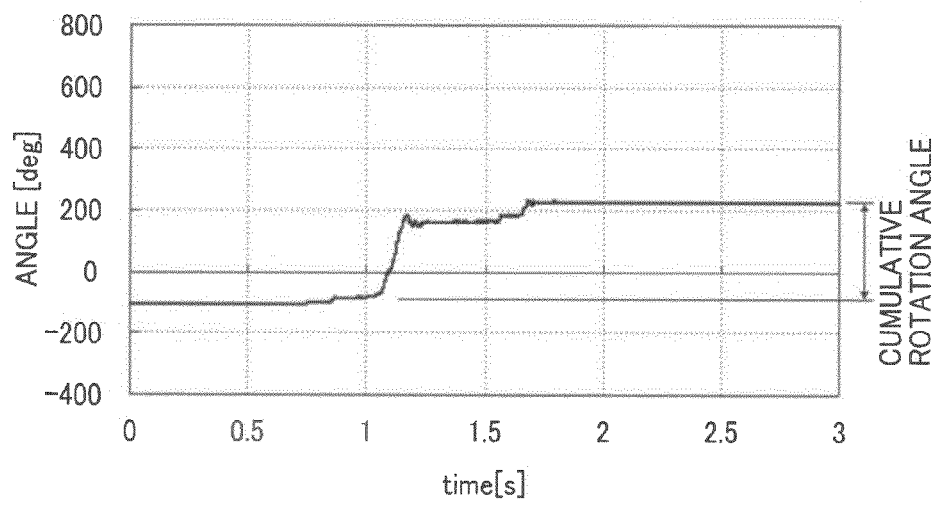
FIG. 50 is a graph showing changes in the cumulative rotation angle of the separation roller when, in a state in which the separation roller surface is slightly degraded, a plurality of overlapping recording sheets are sent to the sheet feed separation nip.

FIG. 50 is a graph showing changes in the cumulative rotation angle of the separation roller when in a state in which the separation roller surface has a medium degree of degradation (no degradation in the sheet feed roller), a plurality of overlapping recording sheets are sent to the sheet feed separation nip. As illustrated in FIG. 50, in this case, the cumulative rotation angle of the separation roller 45*b* further decreases compared to FIG. 49.

Figure 51:
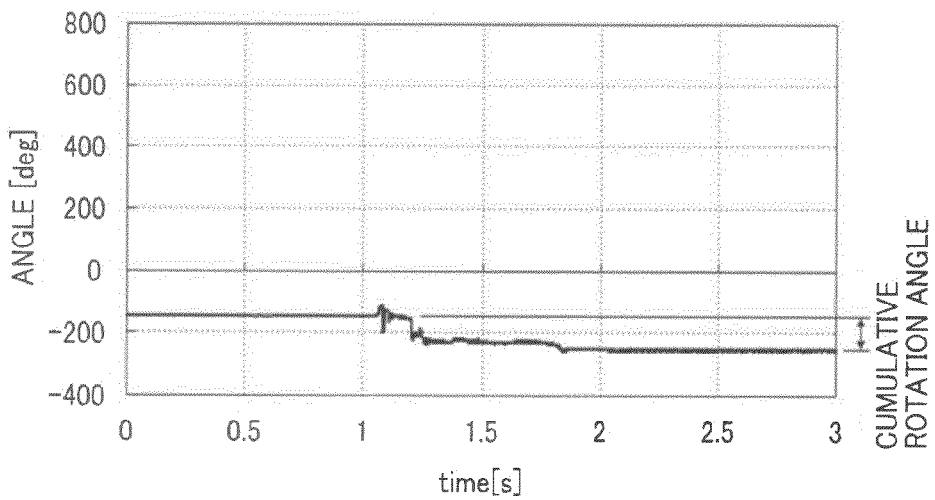
FIG. 51 is a graph showing changes in the cumulative rotation angle of the separation roller when, in a state in which the separation roller surface is severely degraded, a plurality of overlapping recording sheets are sent to the sheet feed separation nip.

FIG. 51 is a graph showing changes in the cumulative rotation angle of the separation roller when, in a state in which the separation roller surface is severely degraded to reach its lifetime (with no degradation in the sheet feed roller), a plurality of overlapping recording sheets are sent to the sheet feed separation nip. As illustrated in FIG. 51, in this case, the cumulative rotation angle of the separation roller 45*b* changes from the plus side to the minus side.

Figure 52:
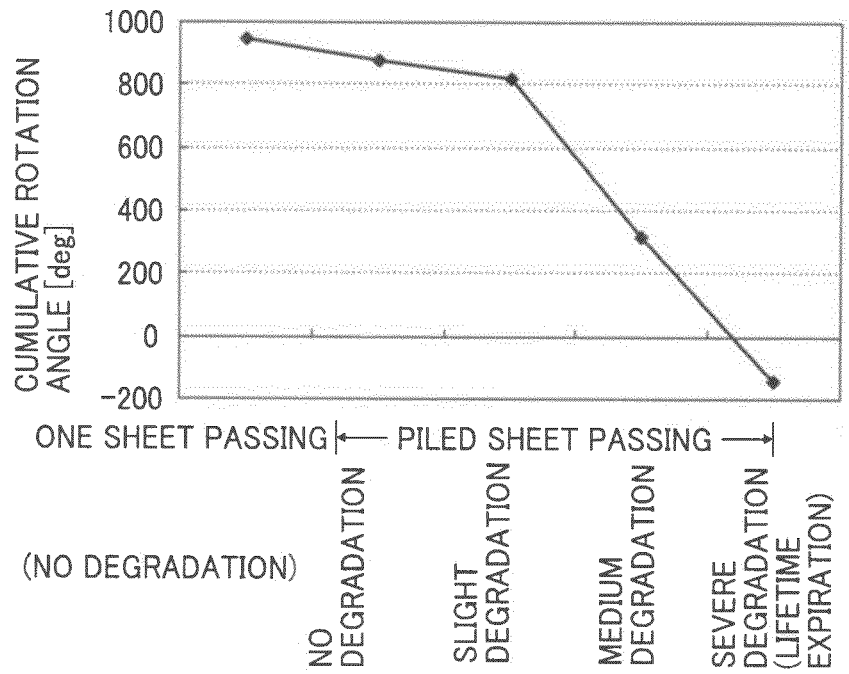
FIG. 52 is a graph showing overall results of experiments in FIGS. 46 and 48 to 51.

FIG. 52 is a graph showing overall results of experiments in FIGS. 46 and 48 to 51. As illustrated, the cumulative rotation angle of the separation roller 45*b* decreases according to the surface degradation of the separation roller 45*b*, and if the surface degradation reaches its lifetime limit, the cumulative rotation angle thereof changes from the plus side to the minus side. Even though there is degradation, in a case of passing one sheet, the cumulative rotation angle does not decrease. Even in a case of passing a plurality of overlapping sheets, the decrease amount is different according to the number of sheets. By averaging the cumulative rotation angle during a certain period of time in the past 10 sheet feed operations, how much degradation occurring to the surface of the separation roller 45*b* can be forecasted.

Using FIGS. 48 to 51, operation of the cumulative rotation angle per one time of sheet feed operation of the separation roller 45*b* in a case in which the surface of the separation roller 45*b* is degraded is described. Similarly, in a case in which the sheet feed roller 45*a* is degraded, the cumulative rotation angle of the separation roller 45*b* decreases in accordance with the progress of degradation.

In a case in which the decrease of the cumulative rotation angle of the separation roller 45*b* during one rotation of the sheet feed operation is due to the degradation of the separation roller 45*b*, the sheet feed roller 45*a* normally conveys the uppermost recording sheet P in the sheet feed direction. Thus, the moving speed of the uppermost recording sheet P is detected as a general value by the speed sensor 120. By contrast, in a case in which the surface of the sheet feed roller 45*a* is degraded, there occurs slippage between the sheet feed roller 45*a* and the uppermost recording sheet. Then, since the uppermost recording sheet cannot be conveyed optimally, the speed sensor 120 is caused to detect a comparatively low value as a moving speed of the uppermost recording sheet P. Therefore, in a case in which a state showing that the lifetime comes to near expiration as illustrated in the graph in FIG. 50 is detected, it should be detected whether the detection result by the speed sensor 120 is a general value or a comparatively low value. By doing so, it can be identified which of the sheet feed roller 45*a* and the separation roller 45*b* is degraded up to near expiration of the lifetime.

Figure 53:
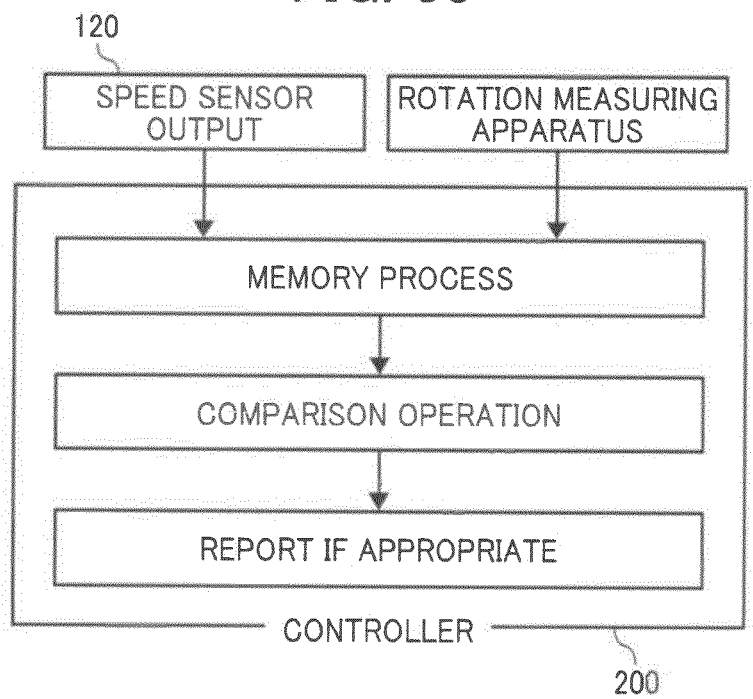
FIG. 53 is a block diagram showing a structure of a degradation determination mechanism according to the embodiments of the present invention.

FIG. 53 is a block diagram showing a structure of a degradation determination mechanism according to the embodiments of the present invention. The degradation determination mechanism includes the speed sensor 120, a rotation measuring mechanism according to the third modified example, a controller 200, and the like. The controller 200 includes a central processing unit (CPU), a RAM, a ROM, and the like. The RAM, a memory means, stores outputs from the Hall sensors 515 and 516 and outputs from the speed sensor 120 as a sheet speed detection means, in chronological order. Then, based on the memory data, the steps as illustrated in FIG. 47 is performed to calculate the cumulative rotation angle or the surface displacement amount of the separation roller 45*b* during one sheet feed operation. Further, based on the calculation result, if it is determined that deterioration of either of the sheet feed and separation roller pair 45 has progressed to a predetermined degree, the moving speed of the uppermost recording sheet is obtained based on the output memory data from the speed sensor 120 and which roller is degraded can be determined and identified.

More specifically, in a case in which the moving speed of the uppermost recording sheet does not exceed a predetermined threshold value, the controller 200 determines that the lifetime of the sheet feed roller 45a comes to near expiration and recommends that a user replace the sheet feed roller 45a. By contrast, if the moving speed of the uppermost recording sheet exceeds a predetermined threshold value, the controller 200 determines that the lifetime of the separation roller 45b comes to be expired soon and recommends that the user replace the separation roller 45b.

When both rollers are degraded, the replacement of the sheet feed roller 45a is first recommended. If the roller degradation is soon detected after the user replaces the sheet feed roller 45b based on the recommendation, the degradation of the separation roller 45b is identified. Then, the replacement of the sheet separation roller 45b is recommended soon.

Figure 54:
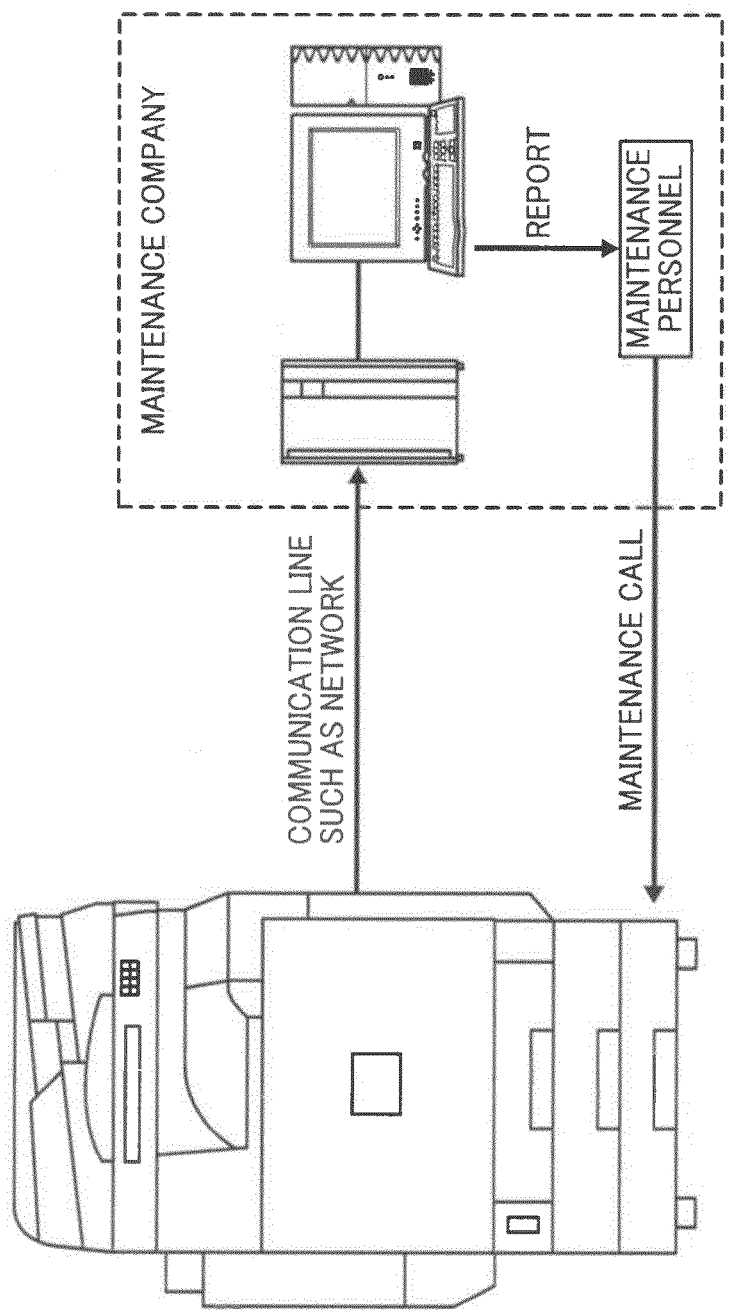
FIG. 54 is a block diagram showing an example in which the copier and a personal computer, as a determining means, are separated.

The speed sensor 120 and Hall sensors 515 and 516 need to be provided to the copier as a detection target, but the determination means including a CPU and the like need not necessarily be provided. As illustrated in FIG. 54, a personal computer as a determination means and a copier mounted with a speed sensor and Hall sensors are connected via a communication line and the roller replacement work can be recommended to the user via the communication line.

An example in which the present invention is applied to the sheet supply unit 40 as a sheet conveyance apparatus to convey the recording sheet has been described heretofore, but the present invention may be applied to the ADF 51 as a sheet conveyance apparatus. In this case, a speed sensor is provided in the vicinity of the nip formed by contact between the sheet feed belt 84 as a conveyance member and the reverse roller 85 as a separation member, so that the moving speed of the original MS as the sheet-shaped member is detected from an upper side (sheet feed belt side). Then, based on the cumulative rotation angle of the reverse roller 85 during one time of sheet feed operation and the detection result by the speed sensor, it can be detected the degree of degradation of the sheet feed belt 84 and the reverse roller 85. In addition, the rotation angle position of the separation roller can be corrected depending on the displacement amount of the separation roller.

Next, a modified example of the copier according to the preferred embodiment will now be described. Unless otherwise specified, the configuration of the modified example is identical with the present embodiment.

The copier according to the modified example includes two sheet detection sensors, each detecting the recording sheet in the vicinity of the sheet separation nip instead of the speed sensor detecting, from an upper side, the moving speed of the recording sheet being conveyed in the vicinity of the sheet feed separation nip.

Figure 55:
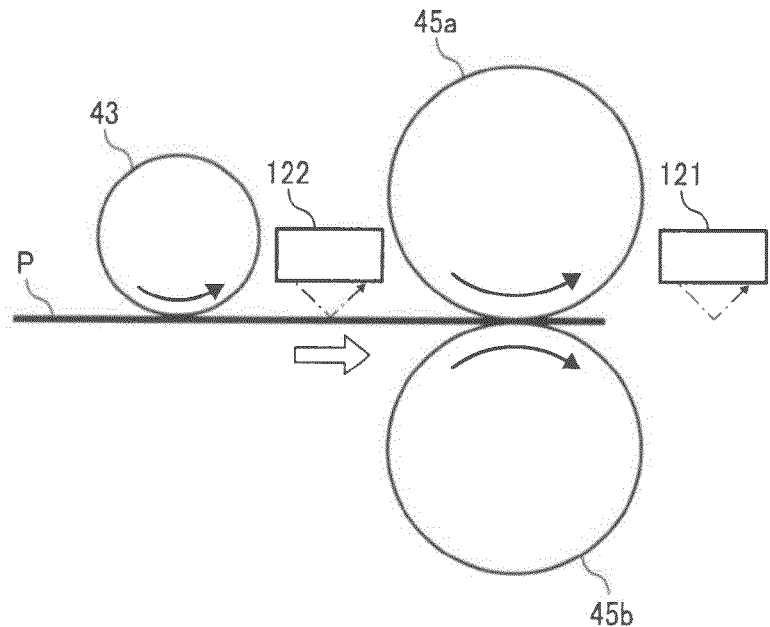
FIG. 55 is an enlarged structural view showing a peripheral structure of the sheet feed separation nip of the copier according to a modified example.

FIG. 55 is an enlarged structural view showing a peripheral structure of the sheet feed separation nip of the copier according to the first modified example. In FIG. 55, a second sheet detection sensor 122 formed of a reflection type photosensor detects, from an upper side of the sheet thickness direction, a leading edge of the recording sheet P which is sent to the delivery roller 43 and before entering into the sheet feed separation nip. A first sheet detection sensor 121 formed of the reflection type photosensor detects, from an upper side of the sheet thickness direction, the leading edge of the recording sheet P immediately after passing through the sheet feed separation nip. The detection signal to detect the leading edge of the sheet by the second sheet detection sensor 122 and the detection signal to detect the leading edge of the sheet by the first sheet detection sensor 121 are sent to the controller. The controller obtains a moving speed of the uppermost side recording sheet P based on the time difference of the timing when each sensor detects the sheet edge. In such a structure, a combination of the first and second sheet detection sensors 121 and 122 and the controller functions as a sheet speed detection means.

In a copier according to the embodiment to detect a moving speed of the recording sheet P by the speed sensor 120 formed of an optical image sensor, there is a problem that the moving state of the sheet surface cannot be detected if a glossy sheet having an excellent surface smoothness is used as a recording sheet P. On the other hand, in the copier according to the first modified example in which the moving speed of the recording sheet is detected based on the time difference of the timing when each of the two sheet detection sensors detects a sheet edge, the moving speed of the recording sheet P can be securely detected even though the sheet has an excellent surface smoothness.

Figure 56:
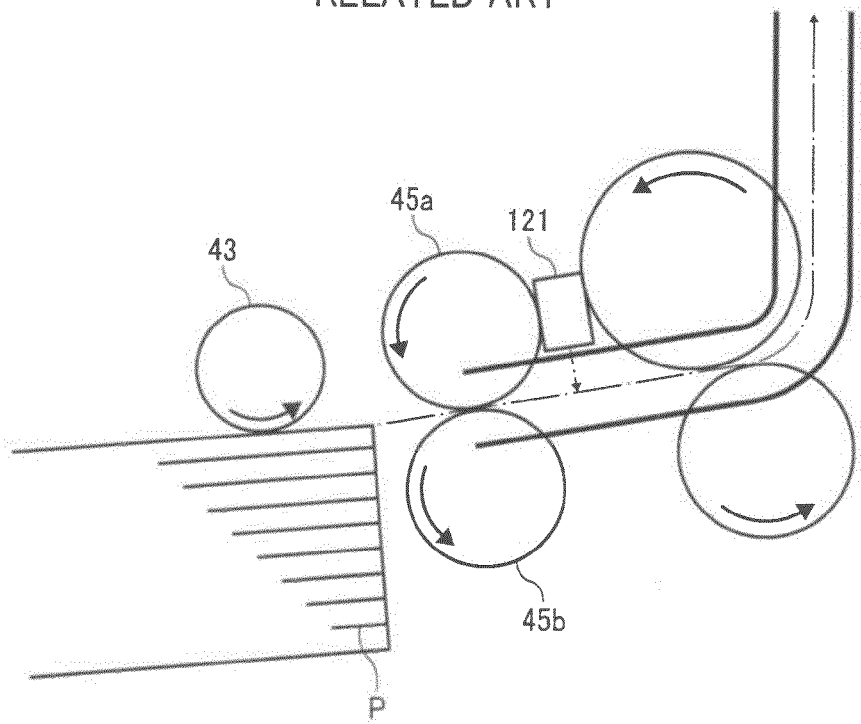
FIG. 56 is an enlarged structural view showing a peripheral structure of the sheet feed separation nip of a conventional copier.

FIG. 56 shows a peripheral structure around the sheet feed separation nip in a conventional copier. As illustrated in FIG. 56, the first sheet detection sensor 121 has conventionally been provided to detect non-sending of the sheet from the sheet feed separation nip. Accordingly, in the copier according to the first modified example, two sheet detection sensors are not provided, and only the second sheet detection sensor 122 is provided. In general, the reflection type photosensor costs lower than the optical image sensor including a plurality of imaging devices, and therefore, a lower-cost product can be obtained. The transmission photosensor can be used as a sheet detection sensor instead of the reflection type photosensor, and in this case also again a lower-cost product can be obtained.

The separation roller in the image forming unit has been described heretofore. The scanner 150 also includes a rotation measuring mechanism related to the third modified example, and the occurrence of the overlapping sheets and the degradation in the reverse roller 85 can be detected.

The rotation measuring mechanism according to the embodiment includes the detection target 510 which has a slant having a point or a first point at one end of the diameter virtual line extending at a predetermined position in the rotation direction of the detection target 510 and another point or a second point at another end of the same diameter virtual line which is configured such that the distance between the first point and the range sensor is closest and the distance between the second point and the range sensor is farthest. The range sensor is provided opposite the slant. The rotation measuring mechanism further includes the first range sensor 511 and the second range sensor 512, each arranged to detect a point at a predetermined rotation angle position with a rotation axis in the detection target set as a center. In such a structure, as described above, each time the roller as a rotatable member to be detected rotates once, the range sensors 511 and 512 each output one cycle of sine wave. In addition, in accordance with the movement of the roller in the direction perpendicular to the rotation axis, the amplitude of the sine wave can be varied.

In addition, in the rotation measuring mechanism according to the third modified example, the magnet 514 arranged to rotate about the roller rotation axis is used as the detection target, and Hall sensors (Hall elements) are used as sensors. The Hall sensors are provided to detect points on the magnet 514 which are provided at predetermined rotation angle positions with the rotation axis of the magnet 514 set as a center. In such a configuration, as described above, each time the roller as a rotatable member to be detected rotates once, the Hall sensors 515 and 516 each output one cycle of sine wave. In addition, in accordance with the movement of the roller in the direction perpendicular to the rotation axis, the amplitude of the sine wave can be varied.

The rotation measuring mechanism according to the fourth modified example includes a detection target 517, a first density sensor 518 and a second density sensor 519. The rotation measuring mechanism uses the detection target 517 having a gradient in the density applied to a diameter virtual line La extending at a predetermined position in the rotation direction of the detection target 517 so that one end portion of the line La has a highest density and another end portion of the line La has a lowest density. Such a density gradient is applied to the surface of the detection target 517 provided opposite the sensor. The rotation measuring mechanism further includes the density sensors 518 and 519, each arranged to detect a density of the point at a predetermined rotation angle position with a rotation axis in the detection target 517 set as a center. In such a structure, as described above, each time the roller as a rotatable member to be detected rotates once, the density sensors 518 and 519 each output one cycle of sine wave. In addition, in accordance with the movement of the roller in the direction perpendicular to the rotation axis, the amplitude of the sine wave can be varied.

In addition, the rotation measuring mechanism according to the first modified example includes a calculation unit 513 as a calculation means to obtain the displacement amount of the roller in the direction perpendicular to the axis based on the output from one range sensor. In such a structure, with a simple structure, the rotation angle position and the displacement amount can be measured.

In addition, the rotation measuring mechanism according to the embodiment includes the first range sensor 511 and the second range sensor 512 each arranged to detect a position in the detection target 510 different from each other. The calculation unit 513 is configured such that the displacement amount of the roller in the direction perpendicular to the axis can be obtained based on the amplitude of the sine wave output from each range sensor. In such a structure, even when the roller is stopped, the rotation angle position of the roller can be detected.

Moreover, the rotation measuring mechanism according to the embodiment includes the first range sensor 511 and the second range sensor 512 which are provided at displacement positions along the direction perpendicular to the axis of the roller 500. In such a structure, as described above, the displacement amount can be detected with higher precision compared to the case in which both sensors are provided along the other direction.

Moreover, the rotation measuring mechanism according to the second modified example employs, as sensors, the first range sensor 511 and the second range sensor 512, each provided to detect a position different from each other. Then, the calculation unit 513 is configured such that the displacement amount of the roller 500 in the direction perpendicular to the axis of the roller 500 is calculated based on the phase shift amount, instead of the amplitude, in the sine wave output from each sensor. The displacement amount may be detected easily based on the phase shift amount.

In addition, in the rotation measuring mechanism according to the second modified example, the calculation unit 513 is configured such that an operation to correct the calculation result of the rotation amount of the roller 500 is performed based on the phase shift amount. Therefore, as described above, the decrease of the detection precision in the rotation amount due to the erroneous detection of the rotation speed change when the roller displaces may be prevented.

In addition, in the rotation measuring mechanism according to the second modified example, the first range sensor 511 and the second range sensor 512 are arranged along the direction perpendicular to the displacement direction along the direction perpendicular to the axis of the roller 500. In such a configuration, as described above, the displacement amount can be detected with higher precision compared to the case in which both sensors are provided along any other direction.

Additional modifications and variations of the present invention are possible in light of the above teachings. It is therefore to be understood that, within the scope of the appended claims, the invention may be practiced other than as specifically described herein.

What is claimed is:

1. A rotation measuring mechanism, comprising:
   a rotary member;
   a detection target mounted coaxially on the rotary member and rotating with the rotary member and linearly movable in a direction perpendicular to an axis of the rotary member;
   a detector to detect the detection target, provided opposite the detection target, that outputs one cycle of a sine wave at each rotation of the detection target, and changes an amplitude of the output sine wave in accordance with displacement of the detection target together with the rotary member in a direction perpendicular to the axis of the rotary member so that rotation of the detection target is detected and displacement of the detection target in the direction perpendicular to the axis of the rotary member is detected; and
   a processor configured to calculate a rotation amount of the rotary member based on the detection target sine wave and the displacement amount of the rotary member in the direction perpendicular to the axis of the rotary member based on the amount of change in the amplitude of the sine wave produced by the detector.

2. A rotation measuring mechanism as claimed in claim 1, wherein the detection target comprises a slanted surface having a first point at one end of a diameter virtual line extending at a predetermined position in the rotation direction of the detection target and a second point at another end of the same diameter virtual line, such that the distance between the first point and the detector is a minimum distance and the distance between the second point and the detector is a maximum distance, and the rotation measuring mechanism comprises range sensors that detect a point at a predetermined rotation angle position about the rotation axis of the detection target set as a center and detect the distance from the sensor to the point in the detection target.

3. The rotation measuring mechanism as claimed in claim 1, wherein the detection target is a magnet provided to rotate about the rotation axis, and the sensor is a Hall element arranged to detect a point at a predetermined rotation angle position about the rotation axis of the magnet and to detect magnetic force exerted by the magnet at the point.

4. The rotation measuring mechanism as claimed in claim 1, wherein the detection target comprises a surface disposed opposite the sensor and having a density gradient such that a point in the detection target at one end of a diameter virtual line extending at a predetermined position in the rotation direction of the detection target has a highest density and another end of the line has a lowest density, and the rotation measuring mechanism comprises density sensors each detecting a point at a predetermined rotation angle position about the rotation axis of the detection target set as a center and detecting the density at the point in the detection target.

5. The rotation measuring mechanism as claimed in claim 1, wherein the processor is configured to calculate a displacement amount of the rotary member in the direction perpendicular to the axis based on the output from one of the sensors.

6. The rotation measuring mechanism as claimed in claim 1, wherein a plurality of sensors are used to detect different positions in the detection target and the processor is configured to calculate a displacement amount of the rotary member in the direction perpendicular to the axis based on amplitude of the sine wave output from each sensor.

7. The rotation measuring mechanism as claimed in claim 6, wherein the plurality of sensors are provided collaterally in the displacement direction along the direction perpendicular to the axis of the rotary member.

8. The rotation measuring mechanism as claimed in claim 1, wherein the plurality of sensors are provided so that each sensor detects a different position and wherein the processor is configured to calculate a displacement amount of the rotary member in the direction perpendicular to the axis based on a phase shift amount of the sine wave output from each sensor.

9. The rotation measuring mechanism as claimed in claim 8, wherein the processor performs an operation to correct the calculation result of the rotation amount based on the phase shift amount.

10. The rotation measuring mechanism as claimed in claim 9, wherein the plurality of sensors are provided collaterally in the direction perpendicular to the displacement direction along the direction perpendicular to the axis of the rotary member.

11. A rotation measuring apparatus, comprising:
a rotary member;
a detection target mounted coaxially on the rotary member and rotating with the rotary member and linearly movable in a direction perpendicular to an axis of the rotary member;
a detector to detect the detection target, provided axially opposite the detection target, that outputs one cycle of a sine wave at each rotation of the detection target and changes an amplitude of the output sine wave in accordance with displacement of the detection target together with the rotary member in a direction perpendicular to the axis of the rotary member so that rotation of the detection target is detected and displacement of the detection target in the direction perpendicular to the axis of the rotary member is detected; and
a processor configured to calculate a rotation amount of the rotary member based on the detection target sine wave and the displacement amount of the rotary member in the direction perpendicular to the axis of the rotary member based on the amount of change in the amplitude of the sine wave produced by the detector.

12. A sheet conveyance apparatus comprising:
a roller pair formed of two conveyance rollers, one fixed and one movable linearly in a direction perpendicular to an axis of the movable conveyance roller, rotating while contacting each other, thereby forming a conveyance nip;
a sheet conveyance unit to convey a sheet of recording media by rotation of the two conveyance rollers; and
a rotation measuring mechanism to measure a rotation amount of the conveyance roller that is movable in a direction perpendicular to a rotation axis and pressing against the other of the two conveyance rollers, the rotation measuring mechanism configured to measure a displacement amount of the movable conveyance roller in the direction perpendicular to the rotation axis in addition to the rotation amount so that rotation of the movable conveyance roller is detected and displacement of the movable conveyance roller in the direction perpendicular to the axis of the rotary member is detected.

13. The sheet conveyance apparatus as claimed in claim 12, further comprising:
a sheet containing unit to contain the sheet of recording media in a stacked state; and
a delivery unit to feed the sheet of recording media to the conveyance nip,
wherein the movable conveyance roller is configured to rotate in the conveyance nip toward a direction reverse to that of the fixed conveyance roller and reverse the lower sheet of recording media toward the delivery unit to separate the sheet of recording media one by one when the sheet of recording media sent out from the delivery unit enters the conveyance nip overlapped with a plurality of sheets, and to function as a separation roller to be driven to rotate following the fixed conveyance roller by an operation of a torque limiter when only one sheet of recording media enters in the conveyance nip.

14. The sheet conveyance apparatus as claimed in claim 13, further comprising a lifetime determining unit to determine the lifetime of the movable conveyance roller based on the rotation amount and the position in the displacement direction of the rotary member in a state in which a sheet of recording media is not present in the conveyance nip.

15. The sheet conveyance apparatus as claimed in claim 14, further comprising a pressing force adjusting unit to adjust a pressing force of the movable conveyance roller against the fixed conveyance roller based on the determination result by the lifetime determining unit.

16. An original reading apparatus comprising:
a sheet conveyance apparatus to convey an original sheet being a sheet of recording media;
an image reading apparatus to read an image of the original sheet being conveyed or already conveyed to a predetermined reading position by the sheet conveyance apparatus; and
the sheet conveyance apparatus as claimed in claim 12.

17. An image forming apparatus comprising:
a sheet conveyance apparatus to convey a recording sheet being a sheet of recording media;
an image forming unit to form an image on the recording sheet to be conveyed by the sheet conveyance apparatus; and
the sheet conveyance apparatus as claimed in claim 12.

* * * * *